(12) United States Patent
Yuyama et al.

(10) Patent No.: US 9,474,691 B2
(45) Date of Patent: Oct. 25, 2016

(54) COINFUSION APPARATUS

(71) Applicant: YUYAMA MFG. CO., LTD., Toyonaka-shi, Osaka (JP)

(72) Inventors: Shoji Yuyama, Toyonaka (JP); Naoki Koike, Toyonaka (JP); Akitomi Kohama, Toyonaka (JP); Akifumi Tanaka, Toyonaka (JP); Masatoshi Warashina, Toyonaka (JP); Kazuki Kawauchi, Toyonaka (JP); Takuya Tsugui, Toyonaka (JP); Sho Oya, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 0 days.

(21) Appl. No.: 14/410,569

(22) PCT Filed: Oct. 17, 2013

(86) PCT No.: PCT/JP2013/078228
§ 371 (c)(1),
(2) Date: Dec. 22, 2014

(87) PCT Pub. No.: WO2014/065196
PCT Pub. Date: May 1, 2014

(65) Prior Publication Data
US 2015/0335531 A1 Nov. 26, 2015

(30) Foreign Application Priority Data

Oct. 25, 2012 (JP) .................................. 2012-235398
Feb. 7, 2013 (JP) .................................. 2013-022248
Sep. 19, 2013 (JP) .................................. 2013-194236

(51) Int. Cl.
*G06F 19/00* (2011.01)
*A61J 1/20* (2006.01)
(Continued)

(52) U.S. Cl.
CPC .................. *A61J 1/2096* (2013.01); *A61J 1/05* (2013.01); *A61J 1/20* (2013.01); *A61J 3/00* (2013.01); *B25J 9/0084* (2013.01); *B25J 21/00* (2013.01); *A61J 3/002* (2013.01)

(58) Field of Classification Search
CPC ............ A61J 1/2096; A61J 1/05; A61J 1/20; A61J 3/00; B25J 9/0084; B25J 21/00
USPC ........... 700/245; 318/568.11, 568.12; 141/18
See application file for complete search history.

(56) References Cited

U.S. PATENT DOCUMENTS

2005/0224137 A1   10/2005   Tribble et al.
2008/0169044 A1   7/2008   Osborne et al.
(Continued)

FOREIGN PATENT DOCUMENTS

CA   2465483 A1 * 6/2012 ................ A61J 1/00
DK   1779830 A1 * 5/2007 ................ A61J 1/20
(Continued)

OTHER PUBLICATIONS

International Preliminary Report on Patentability of PCT/JP2013/078228, issued by officer Yukari Nakamura at The International Bureau of WIPO, Date of mailing May 7, 2015.
(Continued)

*Primary Examiner* — Jaime Figueroa
*Assistant Examiner* — Khoi Tran
(74) *Attorney, Agent, or Firm* — Masuvalley & Partners

(57) ABSTRACT

Embodiments of the present invention provide a coinfusion apparatus capable of automatically performing parts or all of a coinfusion processing. The coinfusion apparatus includes a first robot arm which retains a medical agent container, a second robot arm which performs an operation of inserting a syringe needle of a syringe into a mouth of the medical agent container retained by the first robot arm, and an operation of inserting the syringe needle of the syringe into a coinfusion mouth of a transfusion bag. The coinfusion apparatus further includes a coinfusion processing room which shelters both robot arms and a transfusion bag elevation inclination section, which retains the transfusion bag outside of the coinfusion processing room and positions the coinfusion mouth of the transfusion bag in a coinfusion communication mouth formed in the coinfusion processing room. A trash storage room door is provided in a front surface of the coinfusion apparatus.

6 Claims, 40 Drawing Sheets

(51) Int. Cl.
  *A61J 1/05*   (2006.01)
  *A61J 3/00*   (2006.01)
  *B25J 21/00*  (2006.01)
  *B25J 9/00*   (2006.01)

(56) References Cited

U.S. PATENT DOCUMENTS

| | | |
|---|---|---|
| 2009/0223592 A1 | 9/2009 | Procyshyn et al. |
| 2010/0021348 A1* | 1/2010 | Baldassari ............ G06T 1/0014 422/400 |
| 2010/0241270 A1 | 9/2010 | Eliuk et al. |
| 2012/0241043 A1 | 9/2012 | Perazzo et al. |
| 2014/0020790 A1* | 1/2014 | Yuyama .................... A61J 1/20 141/27 |

FOREIGN PATENT DOCUMENTS

| | | | |
|---|---|---|---|
| EP | 1779830 A1 | 5/2007 | |
| JP | 01-244759 A | 9/1989 | |
| JP | 2679938 B2 | 11/1997 | |
| JP | 2007-21016 A | 2/2007 | |
| JP | 4055150 B2 | 3/2008 | |
| JP | 2009-504199 A | 2/2009 | |
| JP | 2009-198405 A | 9/2009 | |
| JP | 2009-544391 A | 12/2009 | |
| JP | 2010-510513 A | 4/2010 | |
| JP | WO 2010113401 A1 * | 10/2010 | .............. A61J 3/002 |
| JP | WO 2012133052 A1 * | 10/2012 | ................ A61J 1/20 |
| WO | 2010/113401 A1 | 10/2010 | |
| WO | 2012/133052 A1 | 10/2012 | |

OTHER PUBLICATIONS

EPO, Extended European Search Report issued on May 23, 2016 in EP Patent Application No. 13849182.4 (PCT/JP2013/078228), total 8 pages.

* cited by examiner

Fig. 42 (1)
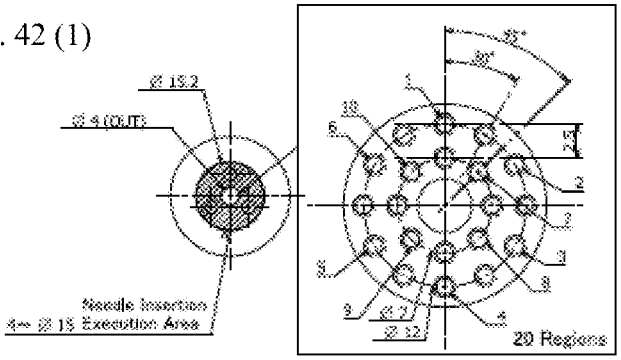
Fig. 42 (2)
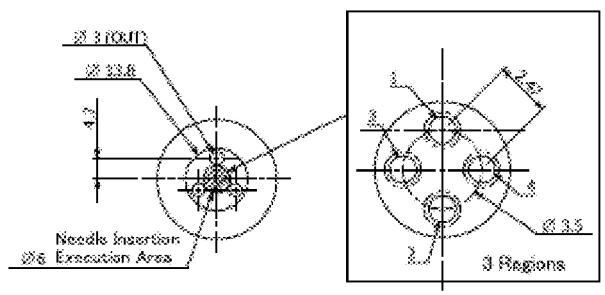
Fig. 42 (3)
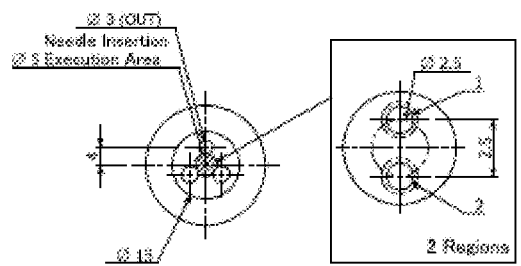

Fig. 43 (4)
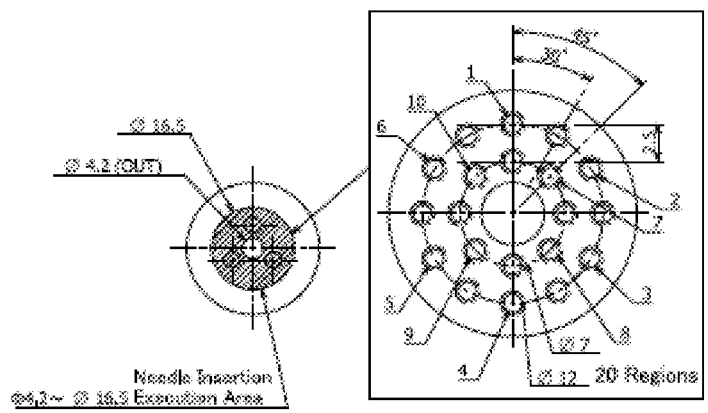
Fig. 43 (5)
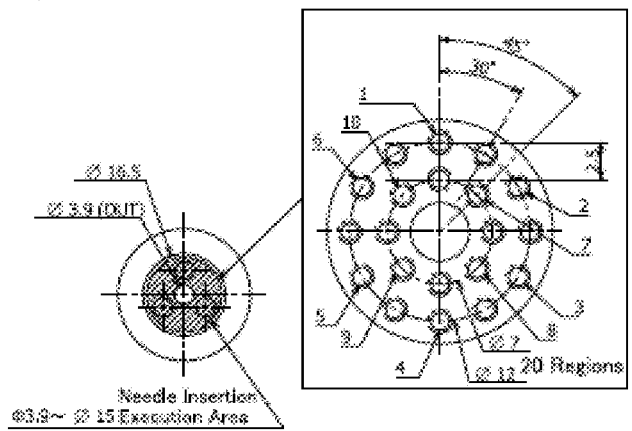

COINFUSION APPARATUS

This application is the national phase entry under 35 U.S.C. §371 of International Application No. PCT/JP2013/078228, filed on Oct. 17, 2013, which claims priority under 35 U.S.C. §119 to Japanese Patent Application No. JP2012-235398, filed on Oct. 25, 2012, Japanese Patent Application No. 2013-022248, filed on Feb. 7, 2013, and Japanese Patent Application No. 2013-194236 filed on Sep. 19, 2013, the contents of which are hereby incorporated by reference in their entirety for all purposes.

TECHNICAL FIELD

This invention relates to a coinfusion apparatus for mixing and preparing medical agent such as anticancer drug with transfusion (replacement fluid).

BACKGROUND ART

Medical agent such as anticancer drug mixed in transfusion poses a risk of exposure. Therefore, a coinfusion processing of mixing such a medical agent or the like with a transfusion in preparation for use is performed in a safety cabinet set under a negative pressure. When coinfusion involves a vial container containing a powder medical agent as the above-mentioned medical agent, a medical agent preparator sucks the transfusion from a transfusion bag with a syringe and inserts the syringe needle of this syringe through a cap section (rubber plug) of the vial container to inject the transfusion from the syringe into the vial container. Then, the medical agent preparator uses the syringe to suck the transfusion in which the medical agent has been dissolved. Since there is a fixed amount of the medical agent in the vial container, the medical agent preparator have to repeat this operation of injecting the transfusion and then sucking it for a plurality of the vial containers until the required amount of the medical agent is dissolved in the transfusion. After the required amount of the medical agent is dissolved in the transfusion, the medical agent preparator inserts the syringe needle through the coinfusion mouth of the transfusion bag into the transfusion bag, and injects the transfusion which now contains the medical agent dissolved therein, from the syringe back to the transfusion bag.

Coinfusion processing involves not only the vial containers. In another type of coinfusion processing, a liquid medicinal agent in an ampule is injected into a transfusion. In such a coinfusion processing using an ampule, the ampule has its head cut off; then the liquid medicinal agent therein is sucked into a syringe; and the syringe needle is inserted through the coinfusion mouth of a transfusion bag to inject the liquid medicinal agent from the syringe into the transfusion bag.

Japanese Patent Laid-Open No. H1-244759 Gazette (Hereinafter Patent Literature 1) discloses a radioactive medical agent dispensing apparatus for performing a dispensing operation while avoiding radiation exposure caused by radioactive medical agents. Also, Domestic Re-Publication of PCT International Application 2010/113401 Gazette (Hereinafter Patent Literature 2) discloses a medical agent mixing apparatus which is capable of handling medical agents and medical agent containers requiring different handling methods within a single apparatus, by handling each of the medical agent containers in their respectively appropriate container posture.

The apparatus in Patent Literature 1 is not designed as a coinfusion apparatus for injecting a liquid medicinal agent into a transfusion bag, nor is there any disclosure regarding a technique for preventing exposure to the medical agent. The apparatus in Patent Literature 2 is capable of injecting a liquid medicinal agent into a transfusion bag; however, there is no disclosure regarding a technique for appropriate disposal of used medical agent container, syringe, etc. Further, there is much room for improvement in a series of operations for injecting a liquid medical agent into a transfusion bag more appropriately.

In view of the above-mentioned situations, this invention provides a coinfusion apparatus that can automatically perform part or all of the coinfusion processing.

SUMMARY OF THE INVENTION

Embodiments of the present invention provides a coinfusion apparatus including: a first robot arm which retains a medical agent container; a second robot arm which retains a syringe and performs sucking and injection of a liquid medical agent with the syringe; a coinfusion processing room in which at least the two robot arms perform a coinfusion processing; and a controlling section which operates said at least two robot arms for performing a process of sucking a liquid medical agent from inside the medical agent container or a liquid medical agent prepared inside the medical agent container, with the syringe and injecting the liquid medical agent into a transfusion bag with the syringe.

According to the above-described configuration, at least both of said robot arms are operated to perform a process of sucking a liquid medical agent from inside the medical agent container or a liquid medical agent prepared inside the medical agent container, with the syringe and injecting the liquid medical agent into a transfusion bag with the syringe. Therefore, it is possible to automatically perform part or all of a coinfusion processing appropriately.

The transfusion bag may be placed outside of the coinfusion processing room. This arrangement prevents the transfusion bag from being exposed to the medical agent.

The coinfusion apparatus may further include: a trash storage room below the coinfusion processing room; a sealing door for closing the trash storage room; a trash chute which provides communication between the coinfusion processing room and the trash storage room; and a sealing trash lid which is provided inside the coinfusion processing room, above the trash chute. This enables appropriate disposal of used medical agent containers, syringes, etc.

The coinfusion apparatus may further include an air discharge path for reducing an air pressure inside the trash storage room to a negative pressure. The coinfusion apparatus may also include an air discharge path for reducing an air pressure inside the trash chute to a negative pressure. The trash chute may have a connecting section for connection of a mouth of a trash bag. Each of the robot arms may be installed at a position from which the robot arm can drop a trash into the trash chute.

The second robot arm may include a retention section provided by a pair of nail sections which can be brought away from and closer to each other for retaining the syringe. In this embodiment, the nail sections have mutually opposed surfaces, each formed with an inclined section of a downward inclination from an upper end surface of the nail section to the opposed surface. This configuration helps discarding the syringe by moving the nails away from each other, which prevents a flange section of the syringe plunger from being caught by the nails, thereby preventing the syringe from being inclined when dropping.

The second robot arm may include a plunger operating section provided by a pair of nail sections which can be brought away from and closer to each other for retaining a plunger of the syringe and moving the plunger in a stroke motion. In addition, the plunger operating section or a retention section for retaining the syringe may also have grip nails for retaining an item.

The coinfusion apparatus may further include a bent needle detection section for detecting a bend in a syringe needle attached to the syringe.

The bend detection section may detect the bend in the syringe needle by using positional information from optical sensors each including a beam transmitter section and a beam receiver section for allowing a beam to be blocked by the syringe needle of the syringe retained and moved by the second robot arm.

The coinfusion apparatus may further include a syringe take-out door which is provided by a front door section and a back door section formed in a shape of a letter L, pivots around a vertical axis to open and close an opening to and from the coinfusion processing room. The syringe take-out door has a syringe placement table on a back surface of the front door section or a front surface of the back door section, so that the syringe placement table comes outside of the coinfusion processing room and the opening is closed by the back door section when the syringe take-out door is open.

The coinfusion apparatus may further include a syringe needle attaching/detaching device which picks and attaches/detaches a syringe needle which is in a horizontal through upright position.

When the syringe needle of the syringe is inserted into a cap, the following steps may be followed: correcting a relative position between the syringe needle and the cap based on an extent of the bend in the syringe needle detected by the bend detection section so that the needle tip is brought to a center of a mouth of the cap; inserting the syringe needle to a midway of the cap; then aligning a center of a base section of the syringe needle with the center of the mouth of the cap; and continuing the insertion to an end.

The first robot arm may have a pair of concaved grip sections for making contact with the medical agent container when retaining the medical agent container, one of the concaved grip sections being movable. This configuration solves a problem of medical agent containers not being held appropriately due to their shape irregularity or label thickness.

In one embodiment, components inside the coinfusion processing room may be detachable. With this arrangement, at least one of the robot arms is capable of grasping the components to check presence/absence of the components. According to this embodiment, if an attempt to grasp the component is successful, resulting in actual grasping of the component, the success confirms the presence of the component.

In another embodiment, the coinfusion apparatus may further include a needle tip end detection section for detecting a position of a tip of a syringe needle attached to the syringe. In this way, an accurate distance can be obtained from the position in the syringe grasped by the second robot arm to the tip of the syringe needle.

When sucking a transfusion or a liquid medical agent into the syringe, the second robot arm may perform a sucking action necessary for sucking a greater amount than specified in detailed prescription information. This configuration helps when a rubber tip of the plunger in the syringe tends to move against the intention. After this plunger sucking action is made, the plunger is pushed back to the position that matches the specified amount of liquid. This ensures that the specified amount of liquid exists in the syringe main body.

The coinfusion apparatus may include a weighing device for weighing the syringe using an accuracy setting which gives a lower accuracy for a larger mount sucked in the syringe. A longer time is required as a higher accuracy is required in the weighing device, whereas a lower accuracy is required as the amount sucked in the syringe increases. Thus, the arrangement makes it possible to avoid increase in the measuring time which is unavoidable if the weighing device has a fixed accuracy setting regardless of the amount of liquid.

After the syringe is brought into the coinfusion processing room but before a sucking action is made to suck the transfusion or the liquid medical agent using the syringe, the plunger of the syringe may be pushed into the syringe main body. This arrangement eliminates a gap which may exist between the plunger tip and the internal tip of the syringe main body when the syringe was brought into the coinfusion processing room.

The plunger may be pushed into the syringe main body by using the plunger operating section designed to move the plunger, while the second robot arm retains the syringe main body of the syringe. This arrangement takes advantage of the original role of the second robot arm to hold the syringe, leading to a shorter time required for the operation.

In yet another embodiment, the syringe and the medical agent container may be placed on a medical agent tray, and be exposed to the coinfusion processing room by moving the medical agent tray. If this configuration is utilized, the following arrangement can be employed:

The medical agent tray, and a transfusion bag retention section which retains the transfusion bag are placed in a preparation container in a detachable fashion, and the preparation container is set outside of the coinfusion processing room.

The coinfusion apparatus may perform: a process of transferring the medical agent tray from the preparation container which is set at a set position outside of the coinfusion processing room to inside of the coinfusion processing room; a process of passing the transfusion bag retention section from the preparation container to a holding operation section for holding the transfusion bag for needle insertion, with the medical agent tray left inside the coinfusion processing room; a process of returning the preparation container without the transfusion bag retention section, to the setting position; and a process of returning the medical agent tray to the preparation container which has been returned to the setting position.

In this embodiment, when injecting a transfusion from a transfusion bag into a medical agent container which contains a powder medical agent, using a syringe, it becomes possible to pass the transfusion bag retention section to the holding operation section which is designed to hold the transfusion bag for a needle insertion operation, while other processes are underway, such as taking the syringes and the medical agent containers out of the medical agent tray and setting the syringe to the robot arm. By the time the syringe is ready to suck the transfusion from the transfusion bag, the transfusion bag retention section has already been passed to the holding operation section. Therefore, it is possible to start the process of sucking the transfusion from the transfusion bag immediately by using the syringe which is set to the robot arm. Also, in this embodiment, it is possible to return the emptied medical agent tray to the preparation container which has been returned to the said set position.

The medical agent tray may be designed so that it will move down if it receives a load exceeding a predetermined amount while it is exposed to the inside of the coinfusion processing room. This configuration will help, for example, if the robot arm has failed to grasp the medical agent container on the medical agent tray and as a result the medical agent tray has been pressed down. Even in such a case, the medical agent tray moves down and thereby prevents such consequences as breakage of the medical agent container or the medical agent tray.

The medical agent tray may be designed to automatically come up to the position to expose itself to the inside of the coinfusion processing room upon removal of the said load.

The coinfusion apparatus may further include a sensor for detecting an inclination of the medical agent tray exposed to the inside of the coinfusion processing room.

The coinfusion apparatus may further include: a door which opens/closes the coinfusion processing room; a door packing provided around a back surface of the door; a cabinet body packing provided in a cabinet body of the coinfusion processing room for making contact with the door packing when the door is closed; a movable latch provided in the door or the cabinet body; a recessed section formed in the cabinet body or in the door for catching the movable latch; a first sensor for detecting a state of the movable latch; a second sensor for detecting that the door is in proximity of the cabinet body of the coinfusion processing room; and a determination section which determines that the door is closed if the first sensor detects that the movable latch is extended and the second sensor detects that the door is in proximity of the cabinet body of the coinfusion processing room. In this embodiment, it is possible to accurately determine if the door is open or close, with a relatively simple structure composed of the packings, the movable latches, and the sensors.

The coinfusion apparatus may perform: a process of determining a needle insertion execution area selected as a circular region around a center of the coinfusion mouth; and a process of inserting the syringe needle into the needle insertion execution area; to a transfusion bag having a coinfusion mouth with a bottle needle port region not located at a center area of the coinfusion mouth. This arrangement allows the syringe needle to be inserted through the coinfusion mouth while avoiding a case that the syringe needle is inserted into the bottle needle port region.

This invention provides such an effect that part or all of the coinfusion processing can be automatically performed appropriately.

BRIEF DESCRIPTION OF DRAWINGS

The present disclosure is described in conjunction with the appended figures:

FIG. 7(A) is a perspective view illustrating a chuck section of the transfusion bag retention section in FIG. 6, whereas FIG. 7(B) is an explanatory sketch illustrating a relationship between marks and a coinfusion mouth.

FIG. 42 is an explanatory view illustrating an example of coinfusion mouth of a transfusion bag.

FIG. 43 is an explanatory view illustrating an example of coinfusion mouth of a transfusion bag.

DETAILED DESCRIPTION OF EMBODIMENTS

Figure 1:
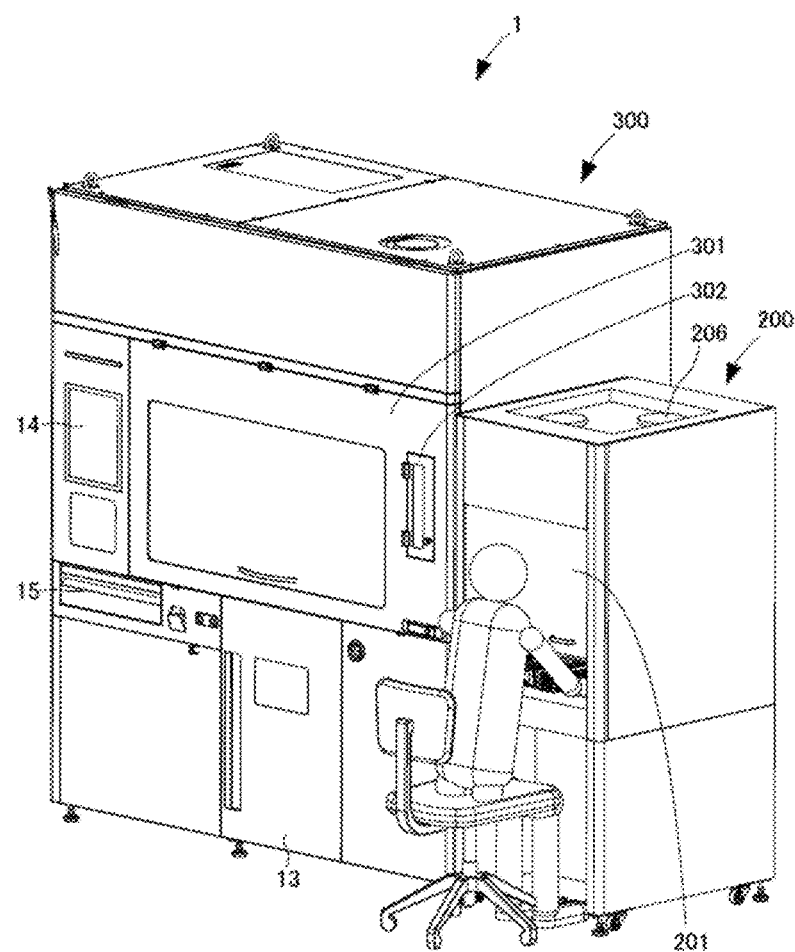
FIG. 1 is a perspective view illustrating a coinfusion apparatus according to an embodiment of this invention.
Figure 2:
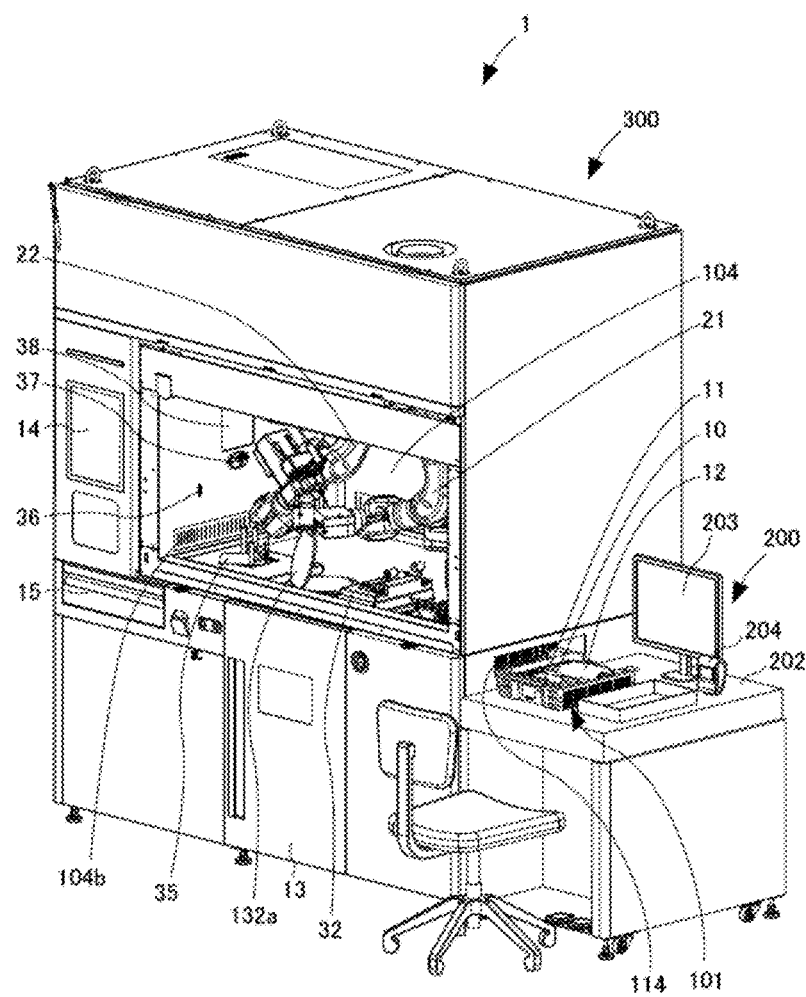
FIG. 2 is a perspective view illustrating the coinfusion apparatus in FIG. 1, with its main door opened.

Hereinafter, embodiments of the present invention will be described with reference to the attached drawings. As shown in FIG. 1 and FIG. 2, a coinfusion apparatus 1 includes a supply section 200 and a main body section 300. The supply section 200 has a door 201, an operation table 202, etc. On the operation table 202, a display 203, a bar code reader 204, etc. are disposed. The supply section 200 is a clean bench equipped with an air purifier 206 and others. On the operation table 202, a preparation container 101 is placed, into which syringes 11, medical agent containers 10, a transfusion bag 12, etc. are manually set, for example, for each patient or each application. The supply section 200 and the main body section 300 are communicated with each other by a communication mouth 114. Through this communication mouth 114, it is possible to place the preparation container 101 into the main body section 300. Alternatively, the supply section 200 may be designed to automatically bring the preparation container 101 into the main body section 300.

The main body section 300 has a front outer wall provided with a main door 301, a syringe take-out door 302, a trash storage room door 13, a touch panel & monitor 14, a preparation container take-out door 15, and so on.

Figure 3:
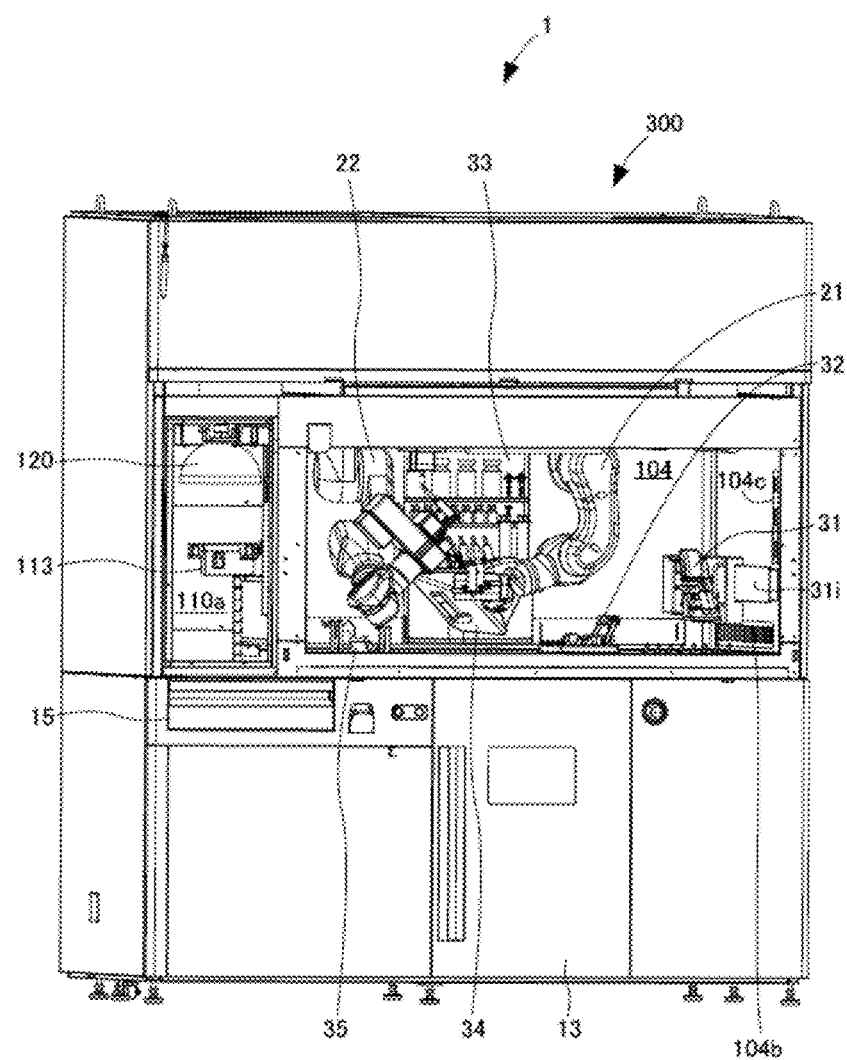
FIG. 3 is a perspective view illustrating the coinfusion apparatus in FIG. 1, with its front wall removed.

The main door 301 is opened to make an access to inside of the coinfusion processing room 104. As shown in FIG. 2 and FIG. 3, the coinfusion processing room 104 has, inside thereof, an ampule cutter 31, an agitator 32, a stand-by rack 33, a medical agent bar code reader 34, a weighing device 35, a bent needle detection section 36, a coinfusion communication mouth 37, a needle insertion monitoring transparent window 38, a trash lid 132a, etc.

Figure 4:
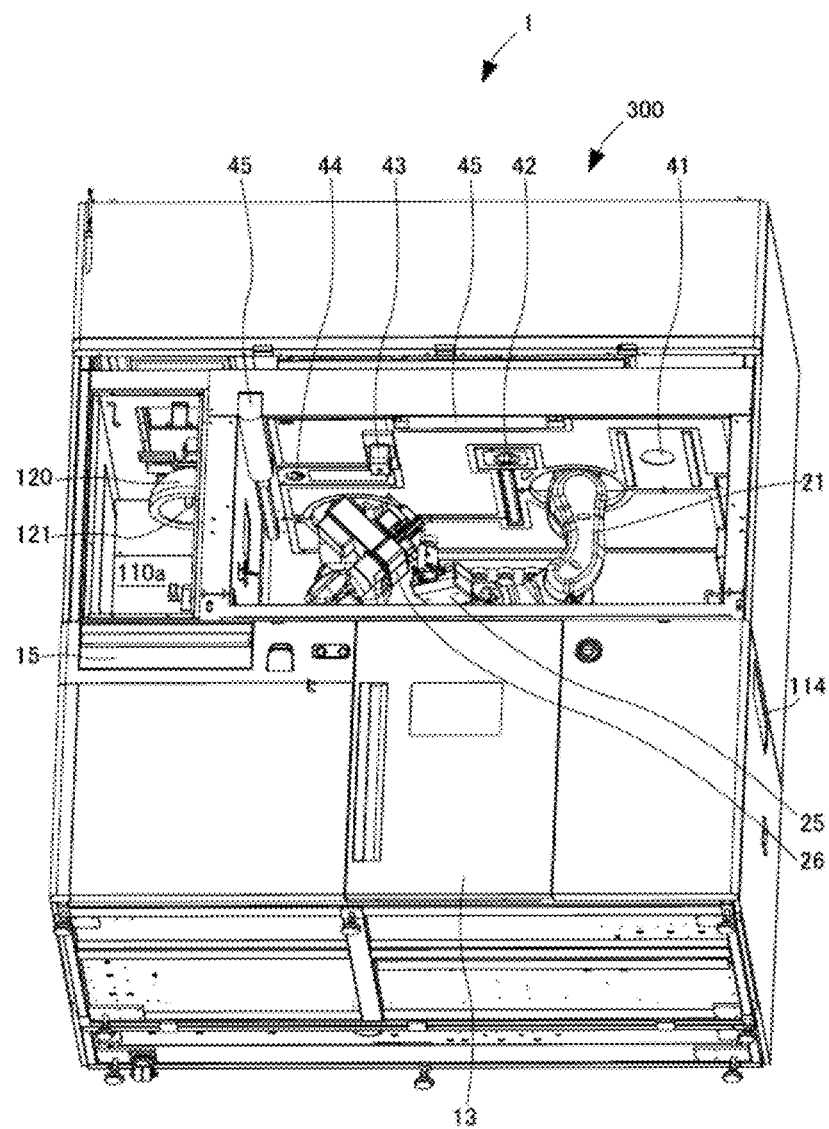
FIG. 4 is a perspective view illustrating the coinfusion apparatus in FIG. 1, with its front wall removed to show a ceiling.

On a ceiling side of the coinfusion processing room 104, as shown also in FIG. 4, there are a tray monitoring camera 41, a syringe monitoring camera 42, a syringe needle attaching/detaching device 43, a needle insertion monitoring camera 44, a sterilizing lamp 45, etc.

In the coinfusion processing room 104, multi-jointed first robot arm 21 and second robot arm 22 are hung from the ceiling, with their base sections fixed. The first robot arm 21 is disposed more closely to the supply section 200 than is the second robot arm 22. The second robot arm 22 is disposed more closely to the coinfusion communication mouth 37 than is the first robot arm 21.

Also, as shown in FIG. 3 and FIG. 4, the left-hand side of the coinfusion processing room 104 is a container transfer end section 110a, above which there is provided a dome light 120 for lighting the transfusion bag 12 when the bag is transferred to the container transfer end section 110a. The dome light 120 has a camera 121 at its center region in order to read a bar code which is provided on a surface of the transfusion bag 12. Since the surface of the transfusion bag 12 is not uniform, reading by means of a normal laser device leads to higher probability of reading errors. Lighting with the dome light 120 reduces problem caused by shadows, and image taking with the camera 121 reduces chances for the errors. Location of the bar code on the transfusion bag 12 is identified from transfusion bag information which is found in a detailed prescription information, and data from a master table (medical agent database, etc.).

Figure 5:
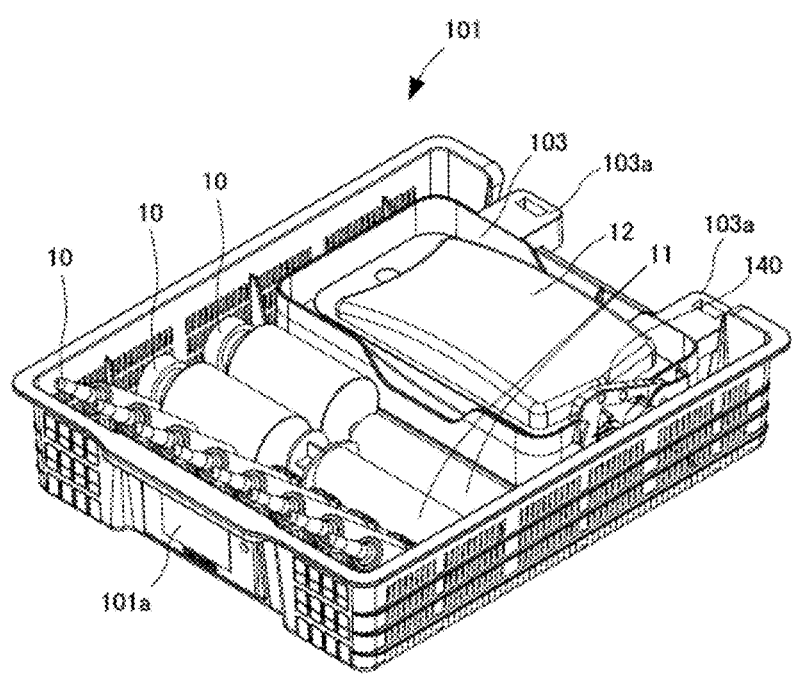
FIG. 5 is a perspective view illustrating a preparation container for use in the coinfusion apparatus in FIG. 1.

As shown in FIG. 5, the preparation container 101 includes therein: a medical agent tray 102 (see FIG. 8 and FIG. 10) on which the medical agent containers 10 and the syringes 11 are placed; and the transfusion bag retention section 103 for retaining a transfusion bag 12; separately from each other under an individually operable state. If the medical agent container 10 is an ampule, then the ampule is set in an inclined state, instead of being laid down on the medical agent tray 102. When the ampule is set in this manner, it is possible to prevent the medical agent from being collected in the neck section of the ampule. In addition to the ampules, syringe needles are also placed at a predetermined place. Vial containers and syringes 11 are placed individually from each other. Obviously, such a layout arrangement is only an example, and is not limiting.

Each preparation container 101 has an electronic paper tag 101a applied thereto, which carries the name of the patient, application, and other information displayed in text. Each preparation container 101 also has an IC tag (e.g., RFID: Radio Frequency Identification) for a controller 500 (see FIG. 9) of the coinfusion apparatus 1 to obtain various information. The controller 500 reads information contained in the IC tag by using an unillustrated reader section, thereby recognizes details of the upcoming coinfusion processing. For example, the controller 500 reads out such information designated by information read from the IC tag, as: patient information, doctor information, coinfusion operation program, detailed prescription information (kinds and numbers of medical agents, syringes, syringe needles, etc. to be used in the coinfusion processing), preparation procedure information (medical agent(s) to be dissolved with/medical agent(s) to be dissolved to; operation details; volume/amount to be dissolved; and amount to be removed), from an unillustrated data storage section. The coinfusion operation program may be different depending on the type of the medical agent container 10 (a vial container with a powder, or an ampule, for example) to be used. Also, the number of repetition of a predetermined operation is determined based on the number of the medical agent containers 10 to be used.

Figure 6:
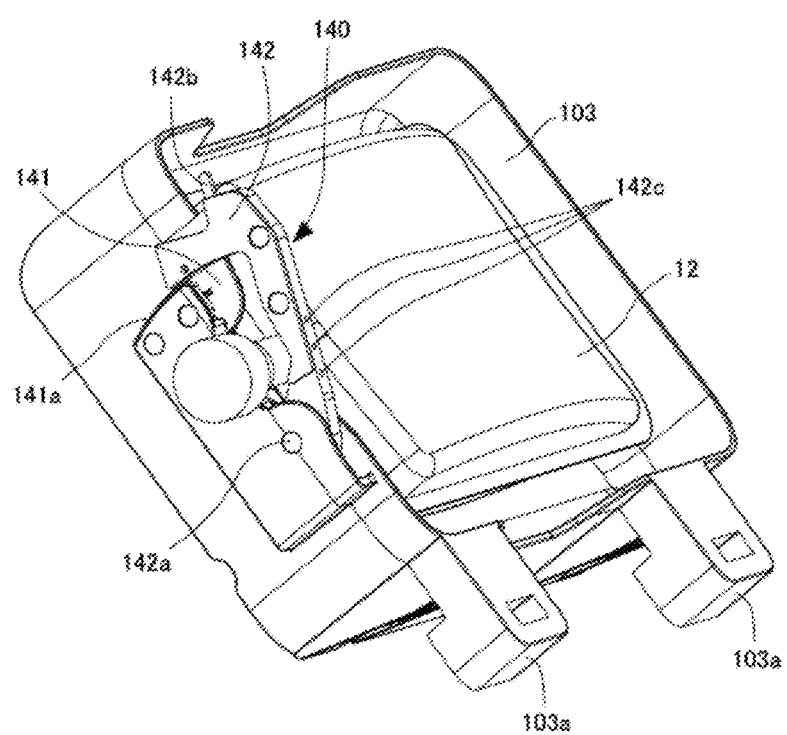
FIG. 6 is a perspective view illustrating a transfusion bag retention section of the preparation container shown in FIG. 5.
Figure 7:
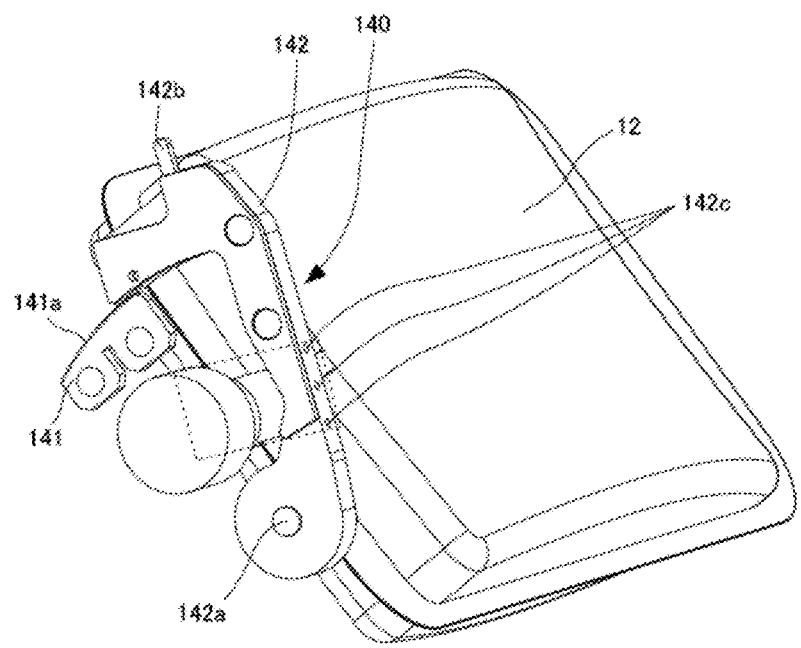
Figure 7:
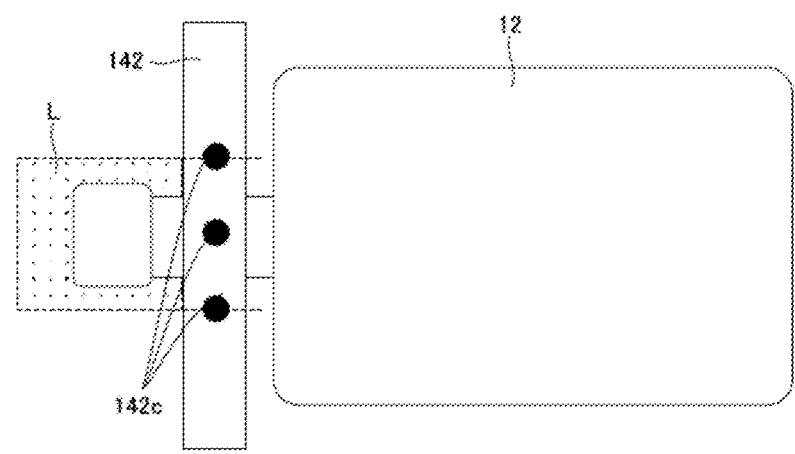

The transfusion bag retention section 103 has a chuck section 140 for fixing the coinfusion mouth (neck section) of the transfusion bag 12. As shown also in FIG. 6, FIG. 7(A) and FIG. 7(B), the chuck section 140 has a lower member 141 and an upper member 142. The lower member 141 is formed with a gear section 141a, whereas the upper member 142 is formed with a ratchet section for engagement with the gear section 141a. As the upper member 142 is pivoted around a pivot point 142a, thereby bringing the ratchet section in engagement with the gear section 141a, it is possible to press down and lock a coinfusion mouth (neck section) of the transfusion bag 12. The upper member 142 has a lever 142b for unlocking the lock. The upper member 142 has an upper surface formed with a plurality (e.g., three) of marks 142c in a straight line for example. When locked, the coinfusion mouth of the transfusion bag 12 comes inside of a region L which is defined as a width between the two outermost ones of the marks 142c. The transfusion bag retention section 103 has two engagement sections 103a which are provided to protrude from the edge of the preparation container 101.

The marks 142c will have an increasingly larger mismatch in the width direction with respect to the coinfusion mouth (neck section) as an angle made by the upper member 142 with respect to the lower member 141 becomes increasingly larger. When taking an image of the transfusion bag 12 with the camera 121 which is provided in the dome light 120 for example, it is possible to include the marks 142c in the image. Then, the controller 500 executes an operation to recognize the coinfusion mouth and the marks 142c in the obtained image; and if the marks 142c are not detected, or if the coinfusion mouth of the transfusion bag 12 is not within the region L, or if the coinfusion mouth does not have its centerline passing through the center mark 142c, then the controller determines that locking is not made properly, and performs an error procedure. Such a case is probable if the coinfusion mouth (neck section) rides on the upper member 142. In this case, the coinfusion mouth hides the marks 142c and makes it impossible to detect the marks 142c.

Figure 8:
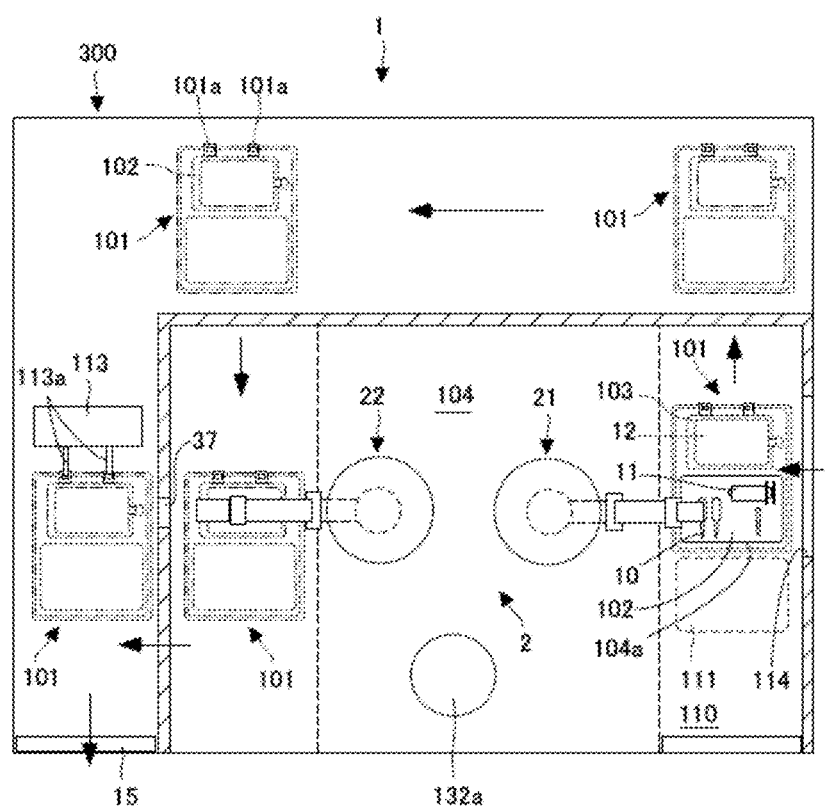
FIG. 8 is a perspective view illustrating a layout relationship including a preparation container transfer path in the coinfusion apparatus in FIG. 1.

As shown in FIG. 8, it is possible through the communication mouth 114, to move the preparation container 101 to the container conveying section 110 of the main body section 300. Inside of the container conveying section 110 has a greater air pressure than inside of the coinfusion processing room 104. The container conveying section 110 transfers the preparation container 101 under the coinfusion processing room 104 and along a rear side of the trash storage room 13a which is located beneath the trash room lid 132a. Therefore, it is possible to access the trash storage room 13a from the front side of the coinfusion apparatus. In order to show the transfer path of the container conveying section 110, FIG. 8 shows the preparation container 101 which is being transferred in the container conveying section 110 in two-dot chain lines. The figure does not mean that there are a plurality of preparation containers 101 in the container conveying section 110 at one time. Alternatively, the preparation container 101 may be transferred deep side of the main body section 300, closely to the left side wall, whereas the transfusion bag elevation inclination section 113 is designed to allow the preparation container 101 to pass under it.

The container conveying section 110 conveys the preparation container 101 from a position which is closer to the first robot arm 21 than to the second robot arm 22, to a position which is closer to the second robot arm 22 than to the first robot arm 21. When the preparation container 101 is near the first robot arm 21, the first robot arm 21 picks up the medical agent container 10, the syringe 11, etc., and then temporarily places them on the stand-by rack 33 in the coinfusion processing room 104. Also, when the preparation container 101 is transferred to a position close to the second robot arm 22, an operation is performed to bring the coinfusion mouth of the transfusion bag 12 retained by the transfusion bag retention section 103 of the preparation container 101, into a position at the coinfusion communication mouth 37 formed in the coinfusion processing room 104. Details of this operation will be described later.

Figure 9:
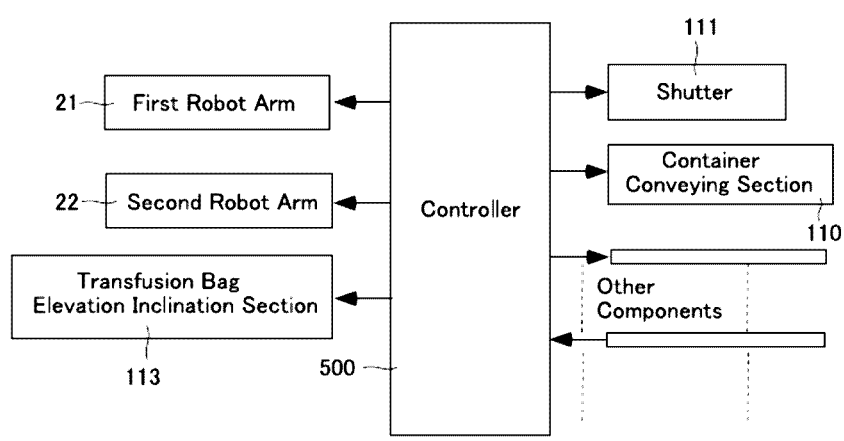
FIG. 9 is a schematic block view of a control system of the coinfusion apparatus in FIG. 1.

As shown in FIG. 9, the first and second robot arms 21, 22 are controlled by a controller (computer) 500. The controller 500 determines, based on an output from a sensor for example, that the preparation container 101 has arrived at the predetermined position within the container conveying section 110 through the communication mouth 114; then horizontally slides a shutter 111 which serves as a door to a tray-path opening 104a, thereby opening communication between the container conveying section 110 and the coinfusion processing room 104. When the shutter 111 is opened, the medical agent tray 102 is exposed to the coinfusion processing room 104 through the tray-path opening 104a. FIG. 8 shows a state where the medical agent tray 102 is exposed to the coinfusion processing room 104. The tray monitoring camera 41 takes an image of the items such as syringe(s) 11 on the medical agent tray 102. Using the image captured by the tray monitoring camera 41, the controller 500 executes an image recognition process to check, for example, if there is a complete set of items such as syringes 11, medical agent containers 10, etc. on the medical agent tray 102 as specified in the detailed prescription information.

Figure 10:
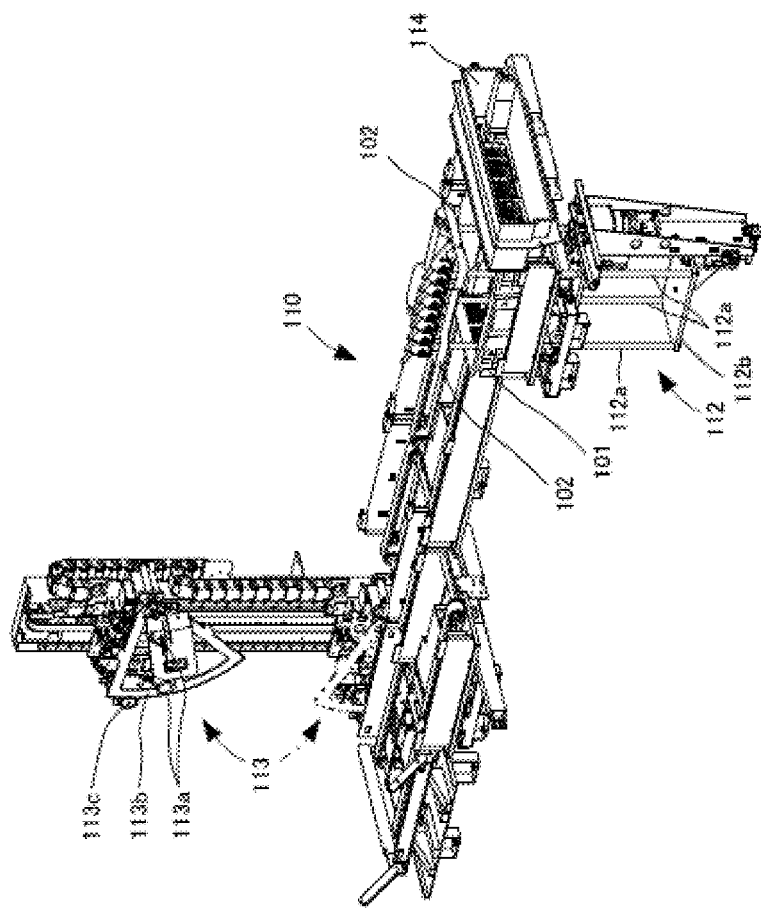
FIG. 10 is a perspective view illustrating a container conveying section and a transfusion bag tilting mechanism in the coinfusion apparatus in FIG. 1.

As shown in FIG. 10, the container conveying section 110 has a tray elevating section 112 to raise and lower the medical agent tray 102 in the preparation container 101 which has been moved through the communication mouth 114 into the container conveying section 110. This tray elevating section 112 raises the medical agent tray 102 from a lower side, by means of four shafts 112a which are designed to raise and lower, for example. The lower surface of the preparation container 101 includes penetration holes for the four shafts 112a to pass through. The controller 500 uses the tray elevating section 112 to elevate the medical agent tray 102, and then performs image taking as has been described earlier, using the tray monitoring camera 41.

The controller 500 controls the first robot arm 21 and the second robot arm 22 to perform such operations as making the first robot arm 21 grip the syringe 11 on the medical agent tray 102 which is exposed to the coinfusion processing room 104 and pass this syringe 11 to the second robot arm 22; placing the syringe temporarily onto the stand-by rack 33 inside the coinfusion processing room 104, etc. Through the image recognition process performed to the image taken by the tray monitoring camera 41, the controller 500 recognizes positions and orientations of the vial containers and syringes which are placed individually from each other, and controls the first robot arm 21. The controller 500 also checks if all of the items have been taken out from the medical agent tray 102, by means of the image recognition process. Alternatively, as has been briefly mentioned earlier, there may be an arrangement that the controller 500 checks the detailed prescription information for the number of medical agents, syringes and syringe needles and a total number thereof, against actual numbers of the medical agents, syringes and syringe needles inside the medical agent tray 102 based on the image taken by the tray monitoring camera 41. Also, these arrangements may include a step of displaying a message indicating an absence of these items, in the touch panel & monitor 14 for a case where there is any missing item. Further, such a determination may be made at an earlier stage before the first robot arm 21 takes the syringes 11 and other items from the medical agent tray 102, by taking an image of the medical agent tray 102 with the tray monitoring camera 41 when the shutter 111 is opened. Such an arrangement makes it possible to issue a warning at an earlier stage, about the lack of medical agents, syringes and/or syringe needles.

After placing all of the medical agent containers 10 and the like from the medical agent tray 102 into the coinfusion processing room 104, the controller 500 performs: an operation to lower the shafts 112a of the elevating section 112; an operation to close the shutter 111; and an operation to transfer the preparation container 101 to a position close to the second robot arm 22. In the coinfusion apparatus 1, the first robot arm 21 is designed to pick up the medical agent container 10 and the like from the medical agent tray 102 and brings them into the coinfusion processing room 104, so the medical agent tray 102 is left in the preparation container 101. Therefore, it is possible to use the medical agent tray 102 repeatedly.

As shown in FIG. 10, the container transfer end section 110a, which is located in the container conveying section 110 at a position close to the second robot arm 22, is provided with a transfusion bag elevation inclination section (holding operation section) 113. Note that although there is only one transfusion bag elevation inclination section 113, FIG. 10 shows the transfusion bag elevation inclination section 113 in a lowered state and the transfusion bag elevation inclination section 113 in an elevated state.

After the preparation container 101 is transferred to a position in front of the transfusion bag elevation inclination section 113, the controller 500 operates the transfusion bag elevation inclination section 113 to move its hook section 113a to hook the engagement sections 103a from below, thereby lifting the transfusion bag retention section 103, to position the coinfusion mouth of the transfusion bag 12 at the coinfusion communication mouth 37. The coinfusion communication mouth 37 is formed at an outward bulging dome-like region in a side wall of the coinfusion processing room 104. The dome-like region is formed with a cutout in an up-down direction for the coinfusion mouth to pass through. Therefore, as the transfusion bag retention section 103 is raised, the coinfusion mouth of the transfusion bag 12 comes inside of the coinfusion processing room 104. If the coinfusion communication mouth 37 is provided with a shutter, the shutter is opened in advance.

The transfusion bag elevation inclination section 113 is formed with a pivotable fan-shaped arc gear section 113b. The arc gear section 113b engages with a gear which is driven by a motor 113c. As the motor 113c is driven, the transfusion bag elevation inclination section 113 tilts the transfusion bag retention section 103, thereby orienting the coinfusion mouth of the transfusion bag 12 in an upward or downward direction.

When removing a syringe needle from the coinfusion mouth of the transfusion bag 12, the controller 500 controls the transfusion bag elevation inclination section 113 to orient the coinfusion mouth in an obliquely upward direction. Orienting the coinfusion mouth in an obliquely upward direction as described prevents leakage of liquid from the coinfusion mouth of the transfusion bag 12 when the syringe needle is pulled off. On the other hand, when inserting a syringe needle through the coinfusion mouth of the transfusion bag 12 to inject a liquid medical agent into the transfusion bag 12, the controller 500 controls the transfusion bag elevation inclination section 113 to orient the coinfusion mouth in an obliquely downward direction. Orienting the coinfusion mouth in an obliquely downward direction as described prevents foaming during the injection while helping the agents mixed with each other.

If the coinfusion communication mouth 37 were on a bottom surface of the coinfusion processing room 104, drips of the liquid medical agent from, e.g., the syringe needle 11c would splash inside the coinfusion processing room 104. Also, if the coinfusion mouth of the transfusion bag 12 were oriented upward, then the layer of the liquid would be lowered. Since the surface of the liquid layer differs from one transfusion bag to another, it would become necessary, for example, to use a long syringe needle 11c in order to reach the liquid layer in a large transfusion bag. Such a problem as the above does not happen, however, since the coinfusion communication mouth 37 is on a side wall of the coinfusion processing room 104. It should be noted here that instead of providing the coinfusion communication mouth 37 on a right-hand or a left-hand side wall, it may be provided in a side wall on the deep back, inside the coinfusion processing room 104.

As shown in FIG. 4 etc., the first robot arm 21 has a container retention section 25 for retention of the medical agent container 10. The second robot arm 22 has a syringe handling section 26 for retaining the syringe 11, and sucking/injecting a liquid medical agent with the syringe 11.

Figure 11:
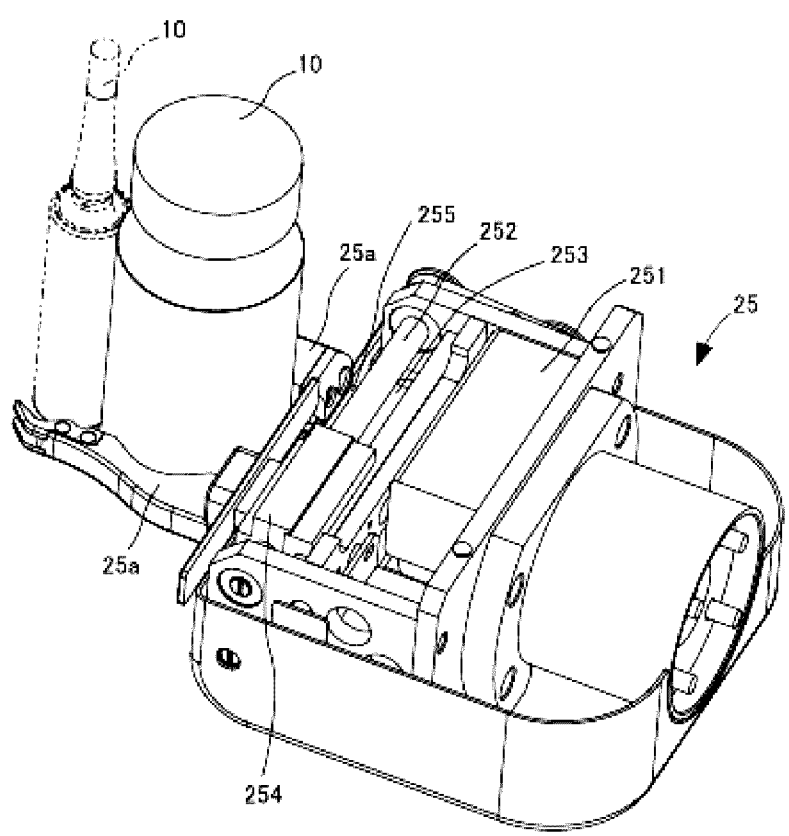
FIG. 11 is a perspective view illustrating a container retention section attached to a first robot arm of the coinfusion apparatus in FIG. 1.

As shown in FIG. 11, the container retention section 25 includes a pair of grip nails 25a, a motor 251, two threaded shafts 252, 253 rotated by the motor 251, and nut blocks 254, 255 each threaded around one of the threaded shafts 252, 253. Each in the grip nails 25a is fixed to one of the nut blocks 254, 255. Thus, as the threaded shafts 252, 253 rotate, the nut blocks 254, 255 move to bring the pair of grip nails 25a closer to and away from each other thereby holding the container retention section 25. The grip nails 25a have recessed sections suitably formed to hold a vial container, and another set of recessed sections suitably formed to hold an ampule on their tip regions. Although FIG. 11 shows both of a vial container and an ampule being held, only one medical agent container 10 is held in an actual operation.

The container retention section 25 can also hold a capped syringe needle or a syringe 11 with the grip nails 25a when the first robot arm 21 temporarily places the medical agent container 10, the syringe 11, etc. on the stand-by rack 33 of the coinfusion processing room 104. Further, the container retention section 25 can measure a diameter of a syringe 11 when it grasps the syringe 11 using the grip nails 25a. The controller 500 checks the measured value against the detailed prescription information to determine if it has grasped a specified syringe 11.

Figure 12:
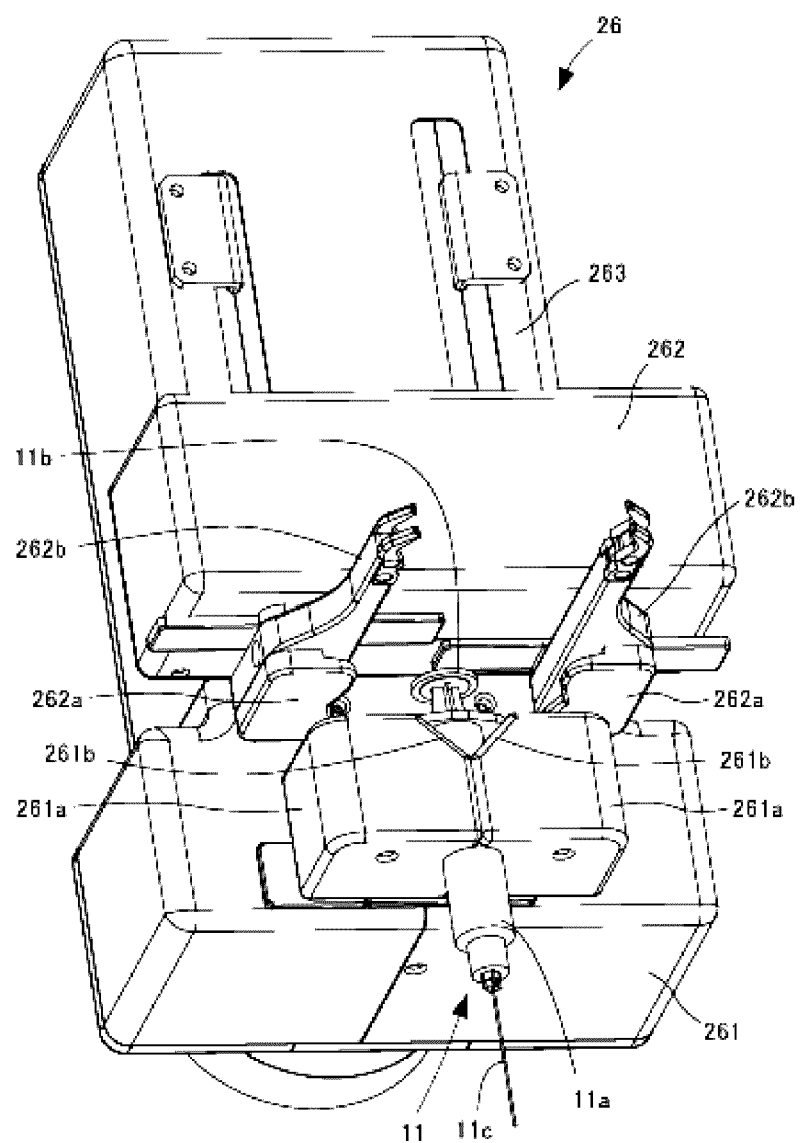
FIG. 12 is a perspective view illustrating a syringe handling section attached to a second robot arm of the coinfusion apparatus in FIG. 1.
Figure 13:
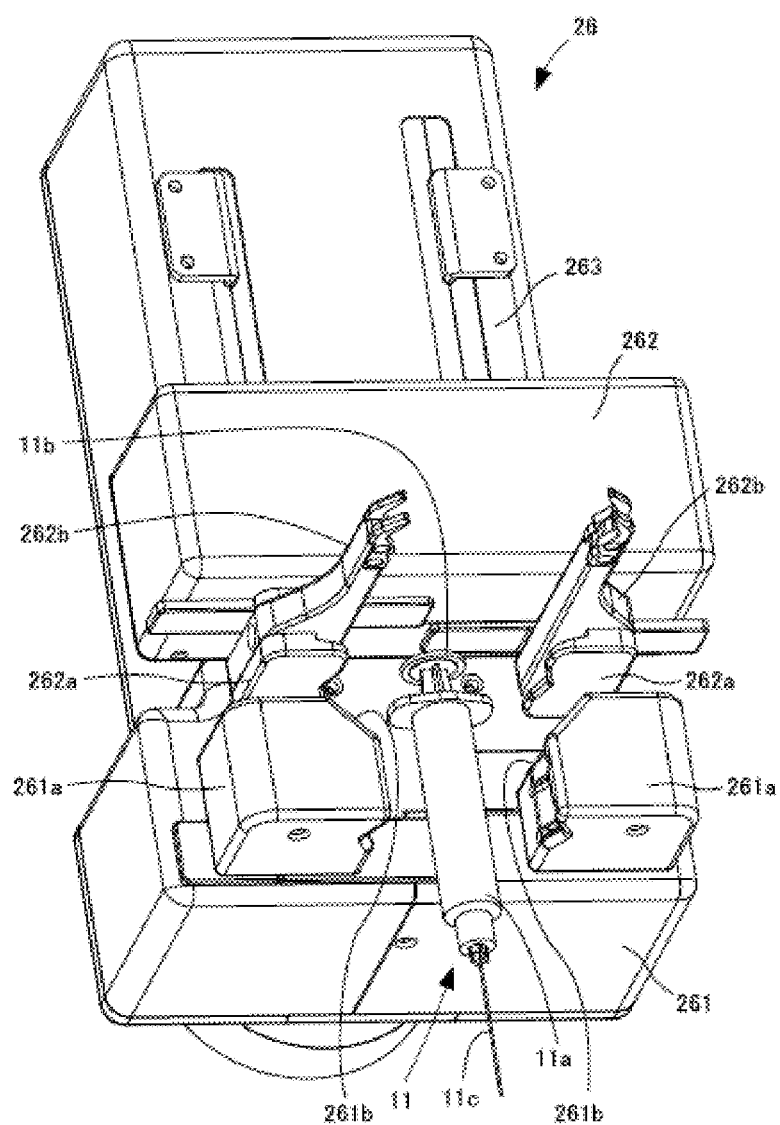
FIG. 13 is a perspective view illustrating the syringe handling section attached to a second robot arm of the coinfusion apparatus in FIG. 1.

As shown in FIG. 12 and FIG. 13, the syringe handling section 26 includes a syringe retention section 261, a plunger retention section 262 and a transfer section 263. The syringe retention section 261 has a pair of grip nails 261a for holding a syringe main body 11a of the syringe 11. The grip nails 261a have the same drive mechanism as used in the container retention section 25, so they can bring closer to and away from each other to grasp the syringe main body 11a of the syringe 11. The grip nails 261a have a pair of mutually opposed surfaces each formed with an inclined section 261b which has a downward inclination from an upper end surface of the grip nail to the opposed surface.

The plunger retention section 262 has a pair of grip nails 262a for holding a flange section of a plunger 11b in the syringe 11. The grip nails 262a have the same drive mechanism as used in the container retention section 25, so they can bring closer to and away from each other to grasp the flange section of the plunger 11b of the syringe 11. Each grip nail 262a has an upper surface, to which the second grip nail 262b is fixed. Thus, as the grip nails 262a are brought closer to and away from each other, the second grip nails 262b are also brought closer to and away from each other and grasp a medical agent or the like. The grip nails 262a have upper surfaces of mutually opposed sides each formed with a recessed section for the flange section of the plunger to fit in. Also, the second grip nails 262b have their tip end protruding forward beyond the grip nails 262a for better grasping of the items. As an alternative arrangement, the second grip nails 262b may be provided in the grip nails 261a.

The transfer section 263 transfers the plunger retention section 262 in the direction in which the plunger 11b of the syringe 11 moves. For this transfer operation, there is provided, for example, a set of a motor, threaded shafts rotated by the motor, nut blocks threaded around the threaded shafts, guides, etc. The plunger retention section 262 is fixed to the nut blocks and is moved as the nut blocks move.

In the present embodiment, the second robot arm 22 performs an operation of inserting the syringe needle 11c of the syringe 11 through the mouth of the medical agent container 10 which is held by the container retention section 25 of the first robot arm 21; and an operation of inserting the syringe needle 11c of the syringe 11 through the coinfusion mouth of the transfusion bag 12.

The first robot arm 21 can bring the medical agent container 10, which is held by the container retention section 25, into an upright position and thereby orienting the exposed mouth in an upward direction. Also, the second robot arm 22 can move the syringe 11, which is gripped by the syringe handling section 26, in a vertical direction thereby orienting the syringe needle 11c downward. Then, under this state, the medical agent container 10 and the syringe 11 are moved closer to each other, and the syringe needle 11c of the syringe 11 is inserted into the mouth section of the medical agent container 10. If the medical agent container 10 is a vial container having a rubber cap, the syringe needle 11c is straightly inserted through the rubber cap.

The first robot arm 21 and the second robot arm 22 incline the medical agent container 10 and the syringe 11 when sucking the liquid medicinal agent from the medical agent container 10 into the syringe 11. If the medical agent container 10 is an ampule, a predetermined amount of liquid medical agent is sucked from the medical agent container 10 and then, the medical agent container 10 is inclined by approximately 100 degrees from the vertical direction so that the liquid medicinal agent is moved to the mouth section (neck section). Thus, a maximum amount of the liquid medicinal agent can be sucked without bringing the tip of the syringe needle 11c of the syringe 11 into contact with the bottom of the medical agent container 10.

By bringing a vial container, i.e., the medical agent container 10, into an inclined position, the liquid medical agent from the syringe 11 will drip onto an inner wall of the vial container. This prevents foaming of the liquid medical agent. In cases where foaming of the liquid medical agent is not a problem, there is no problem in keeping the vial container in an upright position and dripping the liquid medical agent onto the bottom of the vial container from the syringe 11. Foaming also occurs if a vial container is held so that its mouth faces downward and air is injected into the liquid medical agent, from the needle tip. Therefore, it is preferable that the needle tip is at a higher position than the liquid medical agent. In cases where foaming of the liquid medical agent is not a problem, there is no problem in bringing the needle tip into a body of the liquid medical agent and inject air into the body. By checking the detailed prescription information against the information from the master table, it can be determined whether foaming is allowed or not for a specific liquid medical agent.

When sucking a liquid medical agent from a vial container into a syringe 11, a cycle of sucking the liquid medical agent and injecting air into the vial container is repeated. If the liquid medical agent remains inside the syringe needle 11c, this liquid medical agent inside the syringe needle 11c is splashed into the vial container when the air is injected into the vial container. In order to prevent this, the plunger 11b is pulled in the air to draw as much air as to fill the syringe needle 11c, whereby the liquid medical agent inside the syringe needle 11c is drawn into the syringe main body 11a. This removes all liquid medical agent inside the syringe needle 11c, so no liquid medical agent splashes inside the vial container.

In one embodiment, a standard speed (plunger drawing speed) may be assigned to each syringe main body 11a. For example, eighteen standard speeds are pre-determined for a total of eighteen types of syringes depending on its internal diameter. Then, an actual plunger drawing speed to be used by the transfer section 263 is calculated by multiplying the standard speed for the syringe by a speed factor of a syringe needle to be used with. For the syringe needle speed factor, two values, e.g., 1.0 and 0.8, are predetermined based on the needle's internal diameter, etc. The speed factor becomes larger as the internal diameter of the syringe needle is larger. This is because the larger the internal diameter is, the larger is the amount of medical agent which moves from the syringe needle into the syringe; namely, a quick pull on the piston will not result in undesirable vacuum (negative pressure) since the medical agent will smoothly fill the volume created by the pull. If the vacuum (negative pressure) is developed, air will find ways through a gap between the syringe and the syringe needle and/or between the piston and the syringe inner wall, resulting in a problem that the sucked amount of medical agent is less than the predetermined amount, by the amount of air which has entered. The above-described arrangement of assigning the speed factors for different internal diameter of the needle prevents the vacuum problem which will be caused if the plunger drawing speed is excessive for the syringe 11 which is being used.

In another embodiment, moving speed of the transfer section 263 may be controlled: If the drive motor is working within a predetermined threshold range of torque load, then the motor operation is continued but once the torque exceeds the threshold value, then the moving speed is halved or brought to zero until the torque comes below the threshold value, at which time the motor will resume operation at the original speed. This eliminates the need for moving speed control based on the standard speed and the speed factor. Another advantage of this embodiment is that it can handle situations caused by a fact that with the syringe needle's internal diameter being the same, a liquid medical agent having a higher viscosity moves at a slower speed when flowing into the syringe. In the case where standard speed and speed factor are the basis for the moving speed control, a vacuum (negative pressure) can result under a high viscosity; however, the torque-based method described above can avoid a vacuum (negative pressure) even the medical agent has a high viscosity. In other words, there is no need for having a viscosity data for each liquid medical agent yet the problem of vacuum is avoided.

Figure 14:
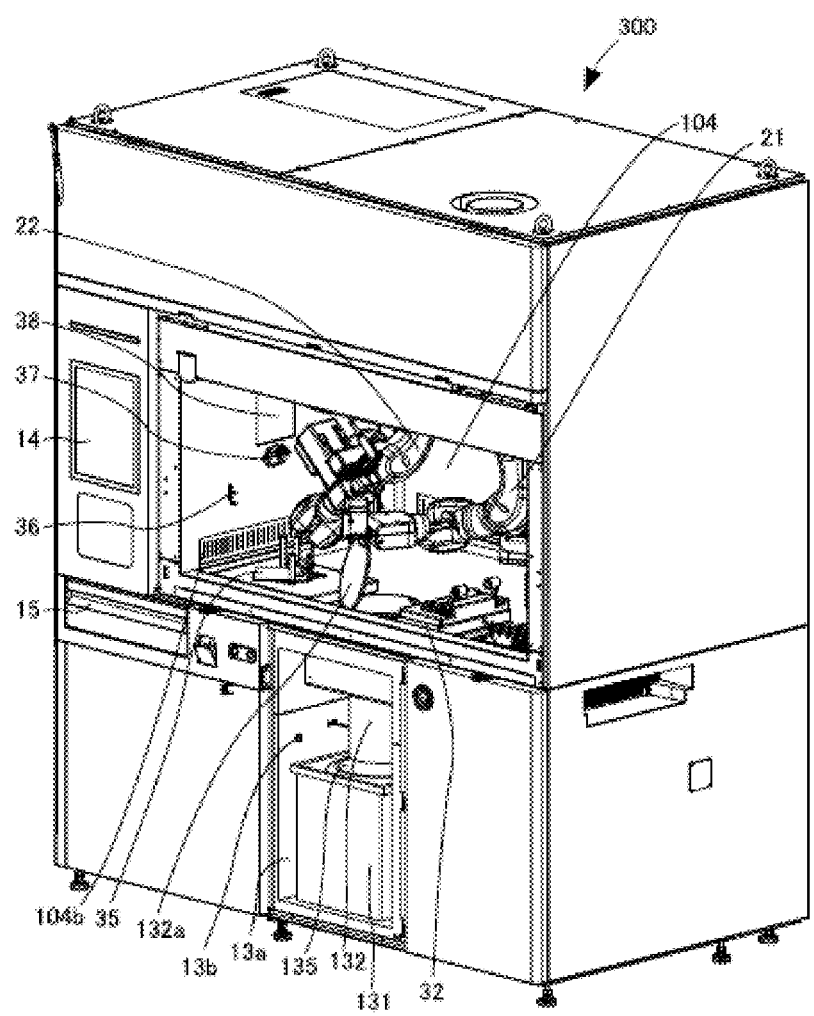
FIG. 14 is a perspective view illustrating the coinfusion apparatus in FIG. 1, with a trash storage room door removed.
Figure 15:
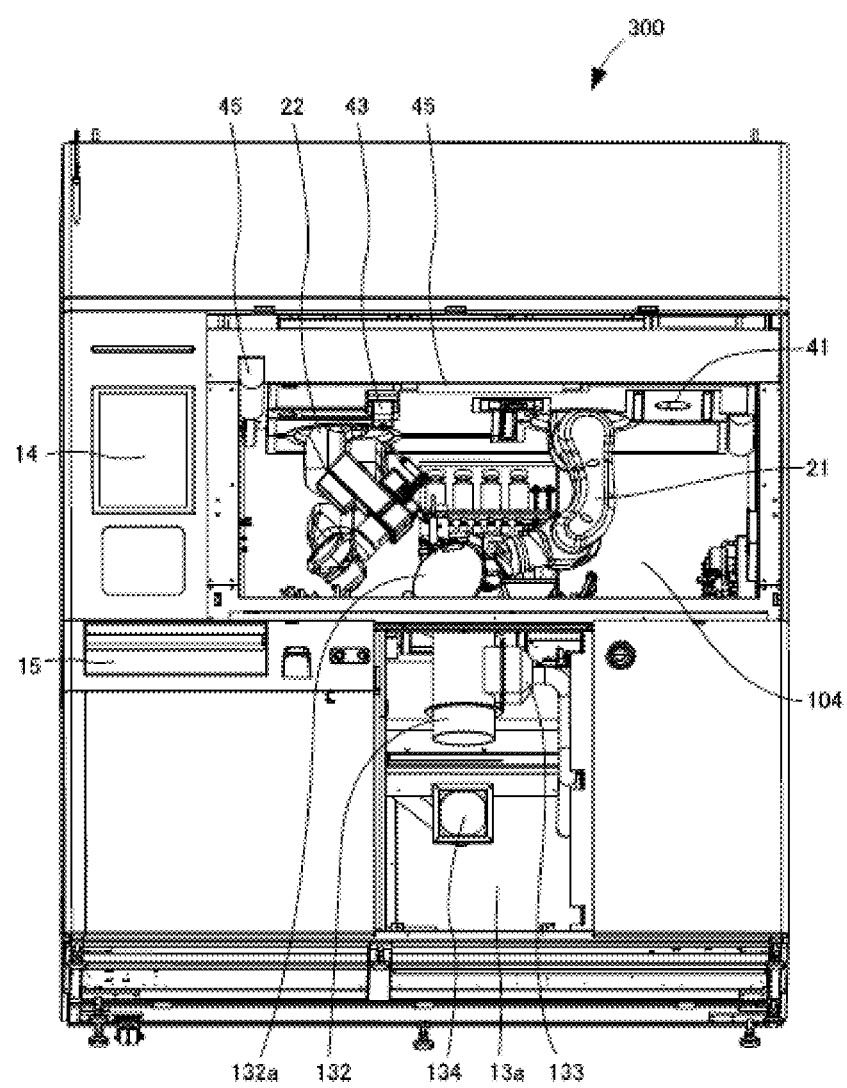
FIG. 15 is a perspective view illustrating the coinfusion apparatus in FIG. 1, with the trash storage room door and a cover removed.

As shown in FIG. 14 and FIG. 15, opening the trash storage room door 13 provides an access to the trash storage room 13a. The trash storage room 13a can accommodate a trash box 131 therein. Also, the trash storage room 13a has a ceiling section provided with a trash chute tube 132 which provides communication between inside of the coinfusion processing room 104 and the trash storage room 13a. A trash bag 135 can be set inside the trash box 131, and it is possible to connect and secure a mouth of the trash bag 135 around a lower end section of the trash chute tube 132 using a hook and loop fastener for example. The trash chute tube 132 has an upper section provided with a sealing trash lid 132a which is operable/closable by means of a hinge.

The sealing trash lid 132a has a locking mechanism which keeps the closed state, and has an actuator such as an electromagnetic solenoid for unlocking. As the locking mechanism is released, an unillustrated spring opens the sealing trash lid 132a. Then, the controller 500 can control the robot arms 21, 22 thereby dropping a used syringe 11 or other disposable waste from the upper end mouth of the trash chute tube 132 into the trash box 131. Aside from the actuator, there may be another actuator for closing the sealing trash lid 132a. In the present embodiment, however, the controller 500 controls the robot arms 21, 22 to close the sealing trash lid 132a. This eliminates the needs for an actuator to close the sealing trash lid 132a. As the sealing trash lid 132a is closed, the locking mechanism locks the sealing trash lid 132a and keeps the closed state.

As has been explained further above, the pair of grip nails 261a, provided in the syringe handling section 26 of the second robot arm 22, have inclined sections 261b which has a downward inclination from an upper end surfaces of the grip nails to the opposed surfaces. This prevents a problem that occurs when a used syringe 11 is dropped from above the trash chute tube 132, the used syringe 11 will make a contact with an inner wall of the trash chute tube 132. If the pair of grip nails 261a had corners at an upper regions of their mutually opposed surfaces, the corners would make contact with the flange section of the plunger 11b in the syringe 11, causing the syringe 11 to drop in an inclined state, possibly resulting in contact with the inner wall of the trash chute tube 132. However, if there are formed the inclined sections 261b instead of the corners, the flange section of the plunger 11b slides on the inclined section 261b, and the syringe 11 drops in a vertical state, so there is no such problems as the above.

The sealing trash lid 132a (the trash chute tube 132) is located at a place accessible from whichever of the two robot arms 21, 22, so trashes generated from whichever of the arms may be discarded into the only one trash box 131 without any hand-over operations of the trash.

The hook and loop fastener mentioned above may be hung on a hanger member provided, for example, on the back wall of the trash chute tube 132. One example for this may be that a lateral-axis hinge which allows pivoting movement of the hanger member is provided, with the hinge axis on a higher side, and the hanger member is urged with a spring so that the hanger member's lower end is spaced from the trash chute tube 132. Such an arrangement of providing the hanger member for hanging the hook and loop fastener makes it easy to attach the trash bag 135. For example, when the trash bag 135 is set inside the trash box 131 and then the mouth of the trash bag 135 is fixed around the lower section of the trash chute tube 132, the mouth of the trash bag 135 can be set to a place where the hanger member's lower end is spaced from the trash chute tube 132. Further, the hanger member which keeps the hook and loop fastener in a hung state helps winding the fastener securely around the trash bag 135. Also, in the winding process, the hanger member presses and holds the trash bag 135. By providing the hanger member on the back wall side of the trash chute tube 132, a human operator can have an easy access when fastening two ends of the hook and loop fastener with each other since the fastening is performed on the front wall side.

Figure 16:
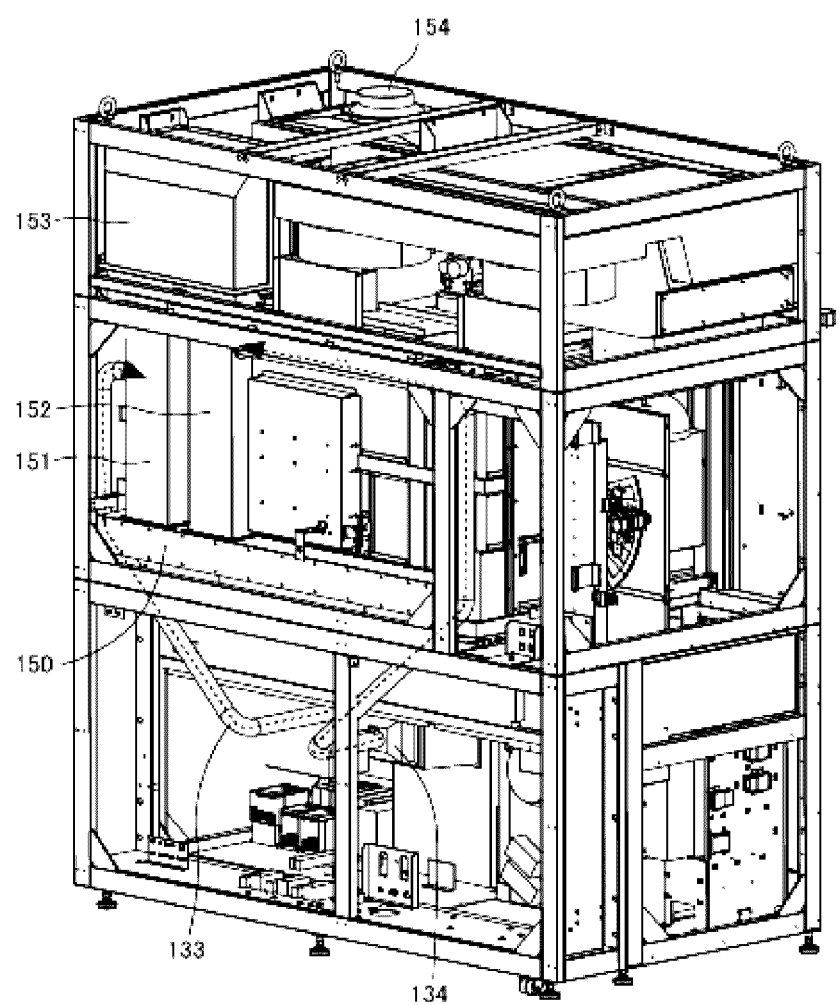
FIG. 16 is a perspective view illustrating the coinfusion apparatus in FIG. 1 from rear, with its outer wall removed.

The main body section 300 is equipped with an air discharge system which sucks air from inside the coinfusion processing room 104 through slits 104b formed in a lower section of a side wall of the coinfusion processing room 104, and discharges the air through ducts 150, 151, 152, 153 and a filter-equipped air discharge fan 154 shown in FIG. 16. Also equipped is an air supply system which introduces air from outside, purifies the air and then introduces the purified air into the coinfusion processing room 104, etc. The air supply system has its supply opening formed in the ceiling section of the coinfusion processing room 104.

The trash chute tube 132 has its side surface connected to an air discharge path 133. The air discharge path 133 is connected to the duct 151. This prevents gasses coming out of used ampules, for example, escaping from inside the trash bag 135 to outside.

The trash storage room 13a has its back wall connected to an air discharge path 134. The air discharge path 134 is connected to the duct 152. This prevents gasses coming out of used ampules, for example, escaping from inside the trash storage room 13a to outside.

Preferably, both the air discharge path 133 and the air discharge path 134 should be provided, but it is acceptable to provide only one of them.

The trash storage room door 13 may be provided with an actuator such as an unillustrated electromagnetic solenoid so as to lock the door mechanically. In addition, an operation button may be provided to activate the actuator to unlock the door. Another arrangement can be to provide the air discharge paths 133, 134 with power air discharge fans. Further, there may be an arrangement that once the operation button is pressed, the power air discharge fans are driven for a predetermined period of time before the door is unlocked. Still further, there may be a lamp, for example, to indicate that the door is unlocked. As another arrangement, a power air discharge switch 13b may be provided in the trash storage room 13a so that the power air discharge fans in the air discharge path 134 are driven when this power air discharge switch 13b is operated. One or both of the power air discharge fans in the air discharge paths 133, 134 may be driven continuously or only during coinfusion processing. Also, a sensor may be provided in the trash storage room 13a to detect presence or absence of the trash bag 135 so that a warning will be issued if the trash storage room door 13 is closed without the trash bag 135.

Figure 17:
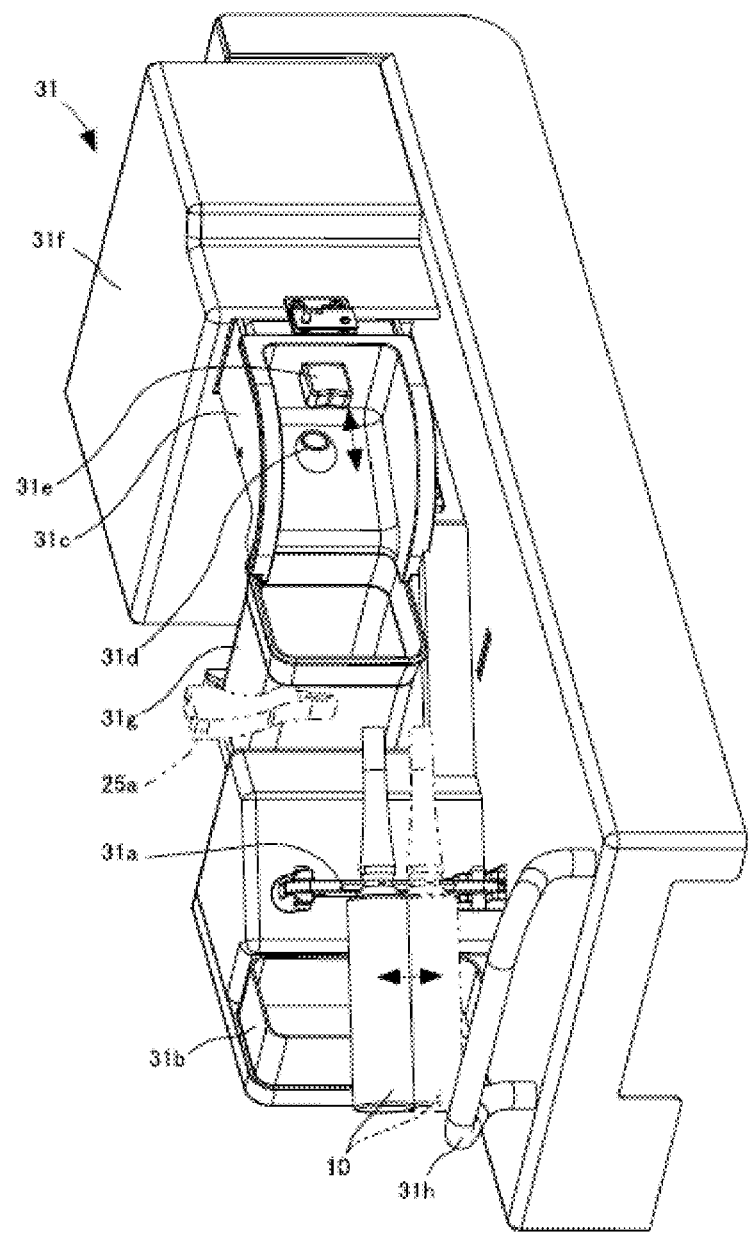
FIG. 17 is a perspective view illustrating an ampule cutter of the coinfusion apparatus in FIG. 1.
Figure 18:
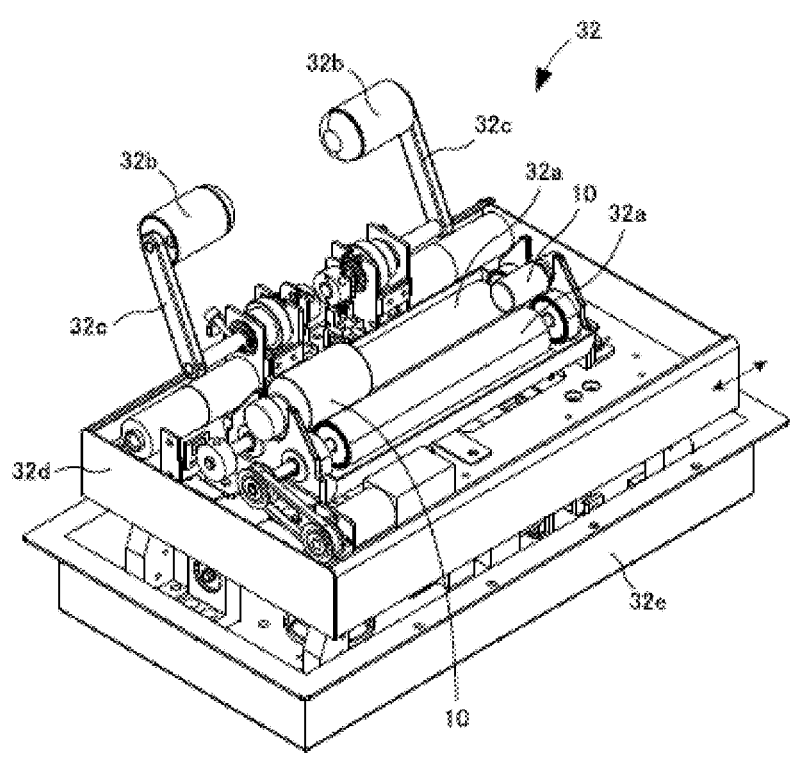
FIG. 18 is a perspective view illustrating an internal structure of an agitator of the coinfusion apparatus in FIG. 1.

As shown in FIG. 17, the ampule cutter 31 has a file section 31a for making a notch in the neck of a medical agent container 10, i.e., an ampule in this case. When the first robot arm 21 picks an ampule from the stand-by rack 33 for example, it grasp on the ampule's body section, at a height lower than the neck by a predetermined distance. The ampule's dimensional information is available from the master table. Thus, the first robot arm 21 brings the ampule neck onto the file section 31a, and slides the neck on the file. The filing dust from this notch making process falls down and is received by a filing dust tray 31b.

The first robot arm 21 then inserts the notched ampule through a hole 31d in a head insertion section 31c from below, so that the part above the neck section protrudes upward. The head insertion section 31c has a pusher 31e on a side of the ampule head section. Inside a drive box 31f, there is provided a cam which works on a rear end of the pusher 31e. As the cam makes a full rotation, the cam causes the pusher 31e to make one reciprocating stroke. The cam is rotated by an unillustrated motor provided inside the drive box 31f.

After the first robot arm 21 makes the ampule head section protrude from the hole 31d, the controller 500 moves the pusher 31e to push the head section. Due to this movement of the pusher 31e the head section is pressed, broken off, and then drops into a filing dust box 31g. The controller 500 can make the first robot arm 21 pick up the filing dust box 31g and throw the head section into the trash bag 135 each time after a cycle of coinfusion processing is completed for example. Similarly, filing dust on the filing dust tray 31b can also be discarded by operating the first robot arm 21. Additionally, the ampule cutter 31 is provided with a handle 31h for a human operator to move the cutter on rails 31i (see FIG. 3) and to perform trash disposal for the filing dust tray 31b and the filing dust box 31g.

As described above, in the present embodiment, the ampule head section is inserted through the hole 31d and then the pusher is moved, i.e., the ampule is not moved when breaking off the head section. Since the head section is broken off while the ampule head section is inserted through the hole 31d, pieces of glass from the broken head section fall into the head insertion section 31c and are received thereby, being prevented from falling into the liquid medical agent inside the ampule. Also, since the ampule is not moved when cutting off the head section, it is possible to design the hole 31d to just fit the ampule head section, with little gap between the two, when the head section is inserted and pressed. By removing gaps as described, it becomes possible to prevent glass pieces from dropping into the ampule through the gaps.

The agitator 32 has two rollers 32a which are spaced from each other and rotated in the same direction. One of the rollers 32a is a drive roller rotated by a motor. The medical agent container 10, a vial container in this case, is placed to ride on the rollers 32a. As the roller 32a rotates, the vial container is rotated and agitation is achieved. Such an agitation is performed when preparing a liquid medical agent by injecting a transfusion into the vial container and dissolving a powder medical agent in the transfusion. The rollers 32a are long in their axial direction, so that two vial containers can be agitated simultaneously. At least one of the rollers 32a is eccentrically rotated, so that the vial container(s) get agitated also in a vertical (up-down) direction. The rollers 32a or the entire agitator may be inclined so as to give agitation in an inclined state.

The agitator 32 has a hold-on section 32b for holding on the vial containers. The hold-on section 32b is provided by, e.g., driven rollers. The hold-on section 32b is moved by pivoting support sections 32c which are pivoted by a motor. The rollers 32a, etc. are supported by a support table 32d, which is supported by a horizontal oscillation mechanism 32e. The horizontal oscillation mechanism 32e can oscillate the support table 32d horizontally by means of a crank mechanism for example. The rollers 32a have each of their axial ends supported with a support section 32f which is formed with a U-shaped cutout. When a vial container 10 is placed on the rollers 32a, the neck of the vial container 10 is fitted into the cutout. When the support table 32d is horizontally moved by the horizontal oscillation mechanism 32e, this helps the vial container 10 move together with the rollers 32a to get agitated also in the horizontal direction while preventing the vial container 10 from rolling away.

Rotation of the driven roller may be detected to determine if the vial container is rotating.

Also, there may be an arrangement that after the agitation operation is completed, the first robot arm 21 picks up the vial container and brings it to near the main door 301 to show the vial container to a human inspector. Then, if the human inspector determines that the powder medical agent in the vial container has not yet dissolved completely, he/she can issue a command for an additional cycle of agitation operation to the controller 500. Upon the addition command, the controller 500 operates the first robot arm 21 to place the vial container onto the agitator 32. Then, the controller 500 drives the agitator 32 for an additional amount of time and again, makes the first robot arm 21 to show the vial container to the human inspector. Once the human inspector looks through the vial container and determines that the powder medical agent is completely dissolved, then he/she brings the agitation operation to an end. Upon reception of the end command, the controller 500 records the additional agitation operation in connection with this particular medical agent, and when the controller 500 receives a subscription which includes this medical agent, the controller 500 performs an enquiry process of asking a human inspector if the agitation time should be extended in advance. The controller 500 is capable of performing an agitation time extending process if the human inspector has indicated "yes" in a response to the enquiry.

In yet another embodiment, the rollers 32a may have a plurality of regions along their longitudinal direction, with one of the regions designed as an eccentric agitation (vertical agitation) region while other regions designed as non-eccentric agitation (non-vertical agitation) regions. In this embodiment, when both vertical agitation and non-vertical agitation are available, there may be a process of checking those medical agents which are supposed to be agitated, to see whether vertical agitation is allowed or not, by making reference to the master table. If any of the medical agents are found incompatible with vertical agitation, then non-vertical agitation will be applied to these agents. Three or more of the rollers 32a may be used to increase the number of vial containers agitated simultaneously. In cases where three or more rollers are provided, the vertical agitation region and the non-vertical agitation region can be provided individually from each other, instead of dividing rollers into different regions along the longitudinal direction as described earlier. Initial settings are made for agitation time, roller rpm and horizontal/vertical agitation amplitude, but these may be customizable by the user. Also, a warning may be issued if the temperature in the coinfusion processing room 104 is lower than a threshold temperature. This prevents a situation where a low temperature prevents a medical agent from dissolving.

Figure 19:
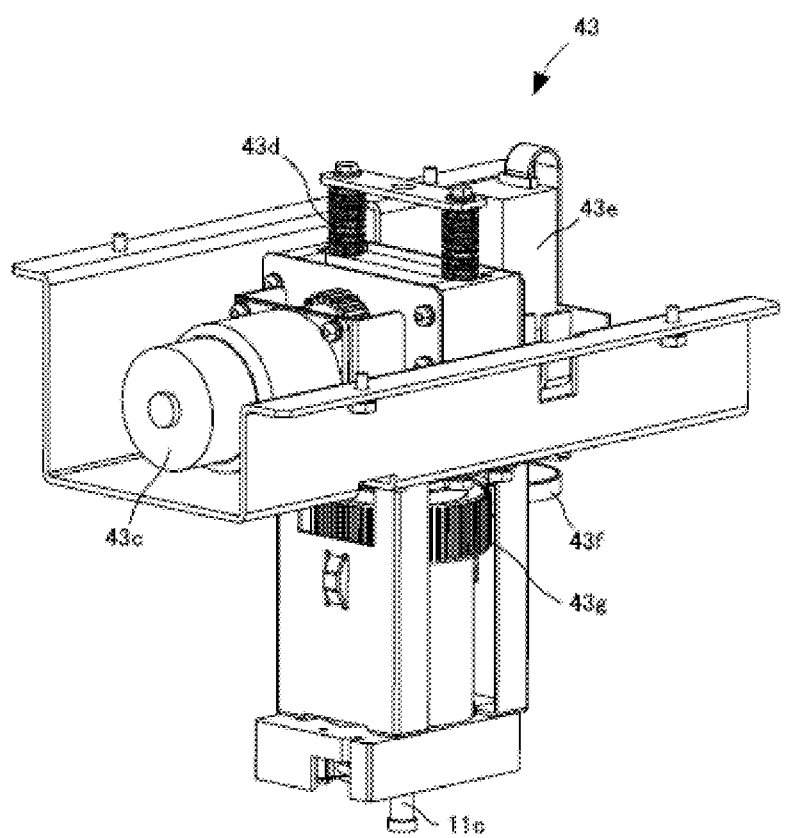
FIG. 19 is a perspective view illustrating an internal structure of a syringe needle attaching/detaching device of the coinfusion apparatus in FIG. 1.
Figure 20:
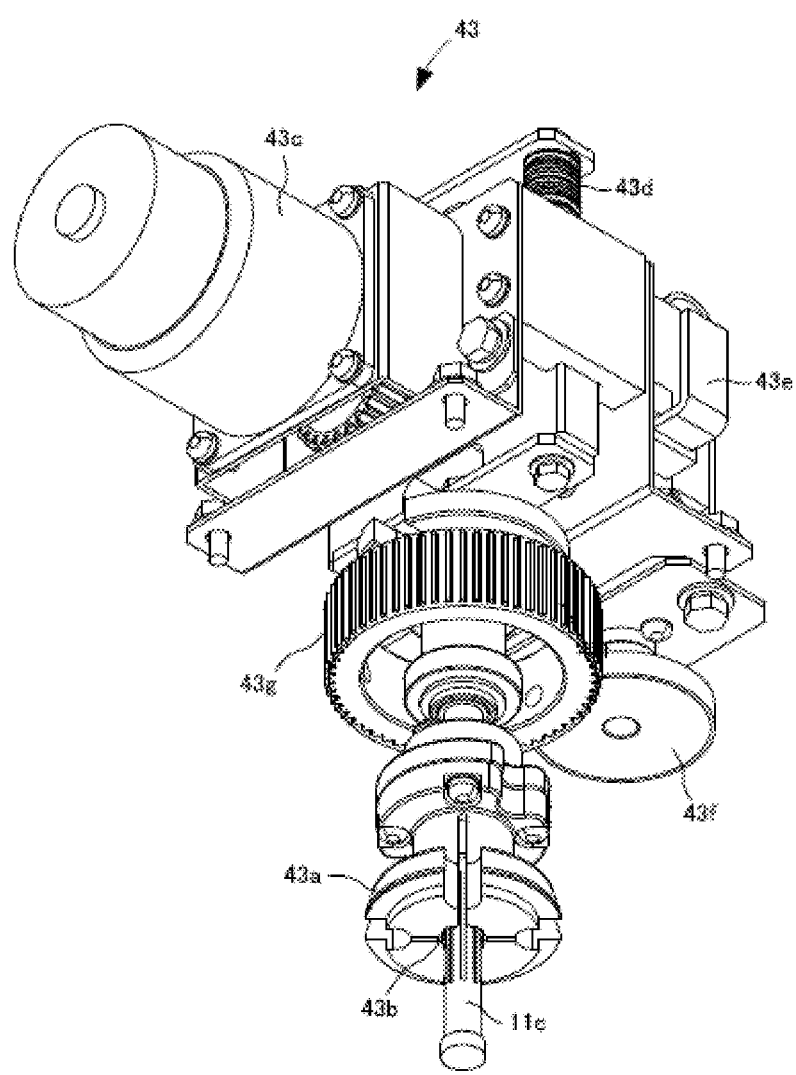
FIG. 20 is a perspective view illustrating an internal structure of the syringe needle attaching/detaching device of the coinfusion apparatus in FIG. 1.

As shown in FIG. 19 and FIG. 20, the syringe needle attaching/detaching device 43 includes a split chuck section 43a formed with a hole section 43b, into which a needle tip of a capped syringe needle 11c is inserted upward. As a motor 43c is driven, an unillustrated cam mechanism enlarges the hole section 43b of the chuck section 43a to allow insertion of the capped syringe needle 11c. Once the motor 43c stops its operation, a spring 43d keeps the capped syringe needle 11c in a captured state. Then, a needle rotation motor 43e is driven to drive a gear 43f and a gear 43g, causing the chuck section 43a to rotate thereby rotating the capped syringe needle 11c. This makes it possible to attach/detach or replace the capped syringe needle 11c to/from the syringe 11. This also makes it possible to automate filter change to a syringe filter when using an ampule. In the syringe needle attaching/detaching device 43, the needle tip of the capped syringe needle 11c is oriented upward. Therefore, with the syringe needle 11c removed, the open tip of the syringe main body 11a is oriented upward, making it possible to prevent dripping of liquid from the opening in the neck section of the syringe main body 11a. It should be noted here that the syringe needle attaching/detaching device 43 may be installed in such an attitude as to orient the needle tip horizontally or obliquely upward when the syringe needle 11c is set therein.

Below is an example of how a cap can be detached/attached:

(A) The first robot arm 21 inserts a capped syringe needle 11c into the syringe needle attaching/detaching device 43, and the syringe needle attaching/detaching device 43 grasps the capped syringe needle 11c.

(B) The second robot arm 22 brings a syringe main body 11a into a syringe needle 11c which is grasped by the syringe needle attaching/detaching device 43.

(C) The syringe needle attaching/detaching device 43 rotates the capped syringe needle 11c, thereby attaching the syringe needle 11c to the syringe main body 11a. Since the syringe main body 11a is pressed onto the syringe needle 11c, rotating the syringe needle 11c causes a threaded section which is formed in the syringe main body 11a to engage with a threaded section formed in the syringe needle 11c, whereby the syringe needle 11c is attached to the syringe main body 11a. (In the capped syringe needle 11c, the cap cannot make relative rotation with respect to the syringe needle 11c, whereas the syringe needle 11c can make relative axial movement toward the syringe needle 11c.)

(D) The syringe main body 11a (syringe 11) which now has the syringe needle 11c is pulled out of the syringe needle attaching/detaching device 43.

(E) The cap remains grasped by the syringe needle attaching/detaching device 43.

(F) After the coinfusion processing, the second robot arm 22 inserts the syringe needle 11c, i.e., the syringe needle 11c which was previously attached to the syringe main body 11a, into the cap which is grasped by the syringe needle attaching/detaching device 43.

(G) The syringe needle attaching/detaching device 43 releases the syringe main body 11a with the syringe needle 11c. The syringe main body 11a with the syringe needle 11c is discarded as a trash.

The steps (E) and (F) can be replaced by the following steps: The first robot arm 21 takes the cap which is grasped by the syringe needle attaching/detaching device 43, out of the syringe needle attaching/detaching device 43. After the coinfusion processing, the first robot arm 21 places the cap onto the syringe needle 11c, which is the syringe needle 11c previously attached to the syringe main body 11a held by the second robot arm 22.

In cases where replacement of the syringe needles 11c is necessary, the following steps are performed:

The above-described steps (A) through (E) are performed.

(a) When it is necessary to replace the needle, the second robot arm 22 inserts a syringe main body 11a which has a syringe needle 11c attached thereto, into a cap which is grasped by the syringe needle attaching/detaching device 43.

(b) The syringe needle attaching/detaching device 43 rotates the cap, thereby removing the syringe needle 11c from the syringe main body 11a.

(c) The syringe main body 11a, with the syringe needle 11c removed, is moved away from the syringe needle attaching/detaching device 43. The cap and the syringe needle 11c grasped by the syringe needle attaching/detaching device 43 is discarded as a trash by the first robot arm 21.

(d) The first robot arm 21 inserts a new capped syringe needle 11c into the syringe needle attaching/detaching device 43, and the syringe needle attaching/detaching device 43 grasps the capped syringe needle 11c.

(e) The syringe main body 11a is pressed onto the syringe needle 11c which is grasped by the syringe needle attaching/detaching device 43.

(f) The capped syringe needle 11c is rotated, whereby the syringe needle 11c is attached to the syringe main body 11a. (During the steps (b) through (f), i.e., while the syringe main body 11a has not been provided with a syringe needle 11c, the syringe main body 11a is held in an upward orienting attitude to prevent liquid leakage.)

(g) The syringe main body 11a which now has the syringe needle 11c is pulled out of the syringe needle attaching/detaching device 43.

(h) The cap remains in the syringe needle attaching/detaching device 43.

Hereinafter, the same steps as (F) and (G) are performed.

Figure 21:
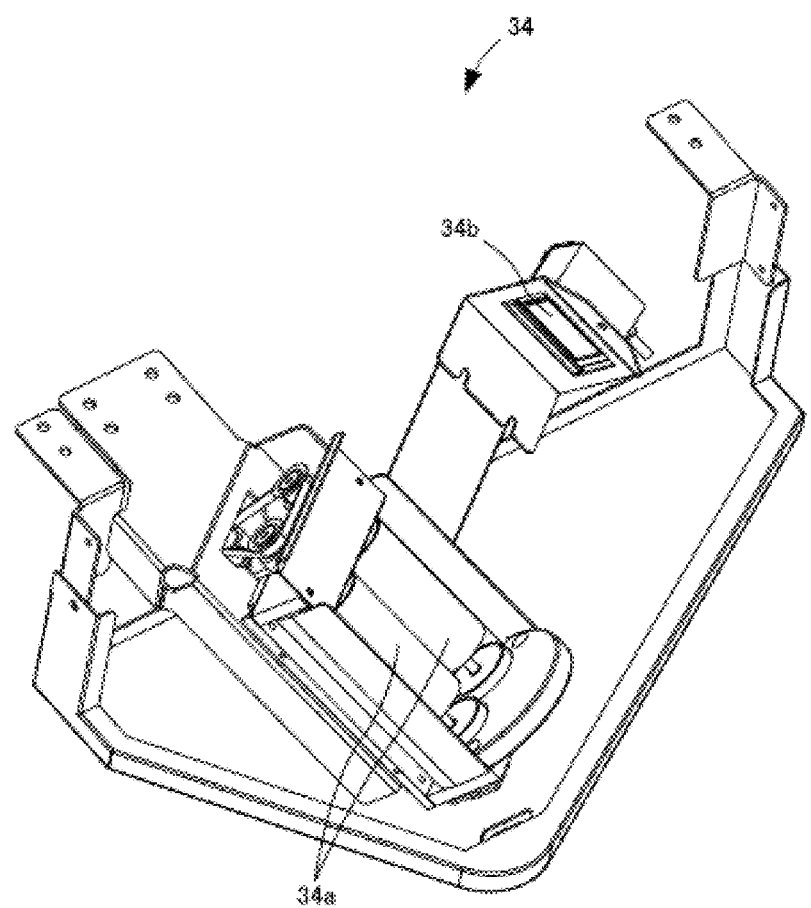
FIG. 21 is a perspective view illustrating an internal structure of a medical agent bar code reader of the coinfusion apparatus in FIG. 1.

As shown in FIG. 21, the medical agent bar code reader 34 includes rollers 34a which are spaced from each other and rotate in the same direction. One of the rollers 34a is a drive roller rotated by a motor for example. The medical agent container 10 is placed to ride on the two rollers 34a. Then the rollers 34a are rotated to turn the medical agent container 10 completely so that a label is faced entirely to a reader section 34b.

Figure 22:
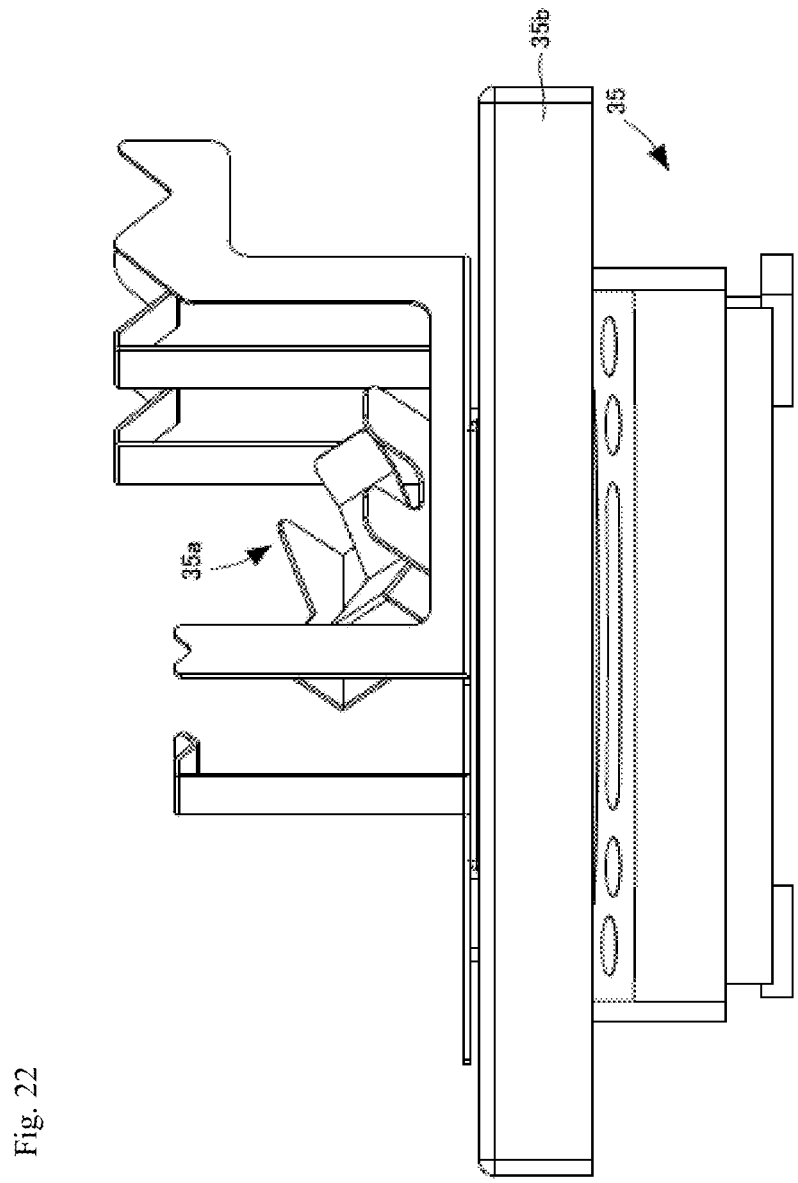
FIG. 22 is a perspective view illustrating an weighing device of the coinfusion apparatus in FIG. 1.

As shown in FIG. 22, the weighing device 35 has a syringe placement table 35a on top of it. Results of measurement by the weighing device 35 are sent to the controller 500. Measuring the syringe 11 with the weighing device 35 makes it possible, for example, to perform calculations such as for obtaining an actually removed amount of liquid medical agent (subtraction of a known weight of the syringe 11 when it is empty, from a weight of the syringe 11 having some liquid medical agent therein). The syringe placement table 35a holds the syringe 11 in an obliquely upward direction to minimize leakage during the weighing process. The weighing device 35 has a main body section with an upper surface provided with a cover 35b, which reduces exposure of the main body section to the air inside the coinfusion processing room 104.

Figure 23:
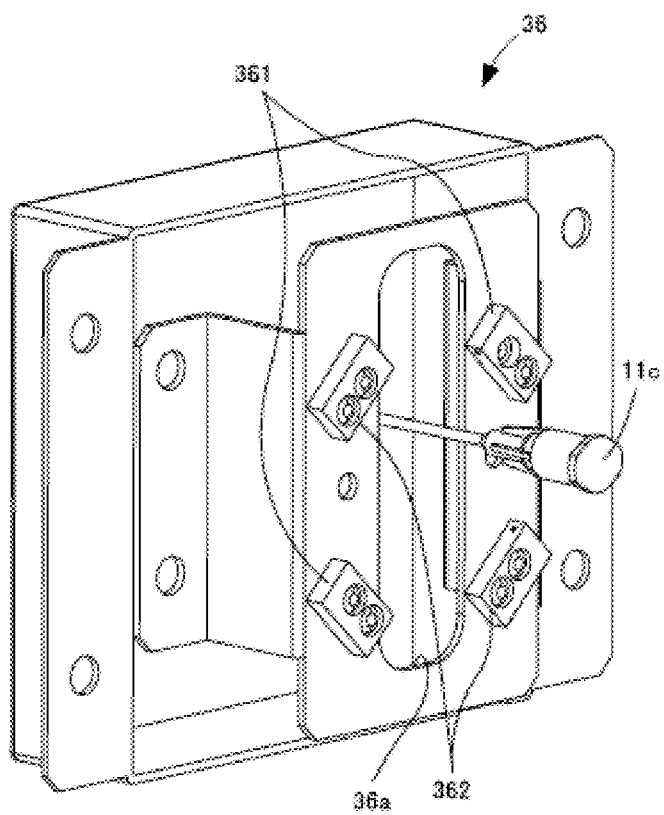
FIG. 23 is a perspective view illustrating a bent needle detection section of the coinfusion apparatus in FIG. 1.

As shown in FIG. 23, the bent needle detection section 36 includes a first optical sensor 361 and a second optical sensor 362 placed in such a manner that beams from these sensors are not parallel to each other. Each optical sensor has a beam transmitter section and a beam receiver section. The bent needle detection section 36 is formed with a long hole 36a for a syringe needle 11c to be inserted and moved therein. The second robot arm 22 inserts a syringe needle 11c which has been attached to a syringe 11, into the long hole 36a and moves the needle, before inserting the needle into the coinfusion mouth of the transfusion bag 12. As the needle moves, the beams are blocked by the syringe needle 11c, and in response, the first optical sensor 361 and/or the second optical sensor 362 are turned off. As the beams are blocked, positional information of the syringe needle 11c is obtained, from which it is possible to detect a bend of the syringe needle 11c.

Figure 24:
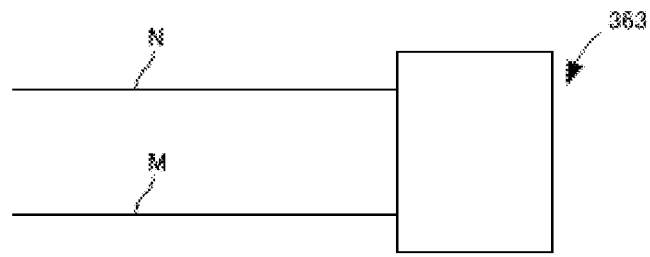
FIG. 24 is an explanatory view illustrating a reference needle used in the bent needle detection section in FIG. 23.

FIG. 24 illustrates a reference member 363. The reference member 363 includes a pair of straight reference needle N and reference needle M spaced by a distance E. For example, when making initial settings for the main body section 300, the second robot arm 22 picks the reference member 363, inserts the reference needle N and the reference needle M into the long hole 36*a*, and moves these needles. During this movement, the beams are blocked by the reference needle N and the reference needle M. The controller 500 obtains position information of the reference needle N and the reference needle M as they block the beams, and store the information as known information in the data storage section.

Figure 25:
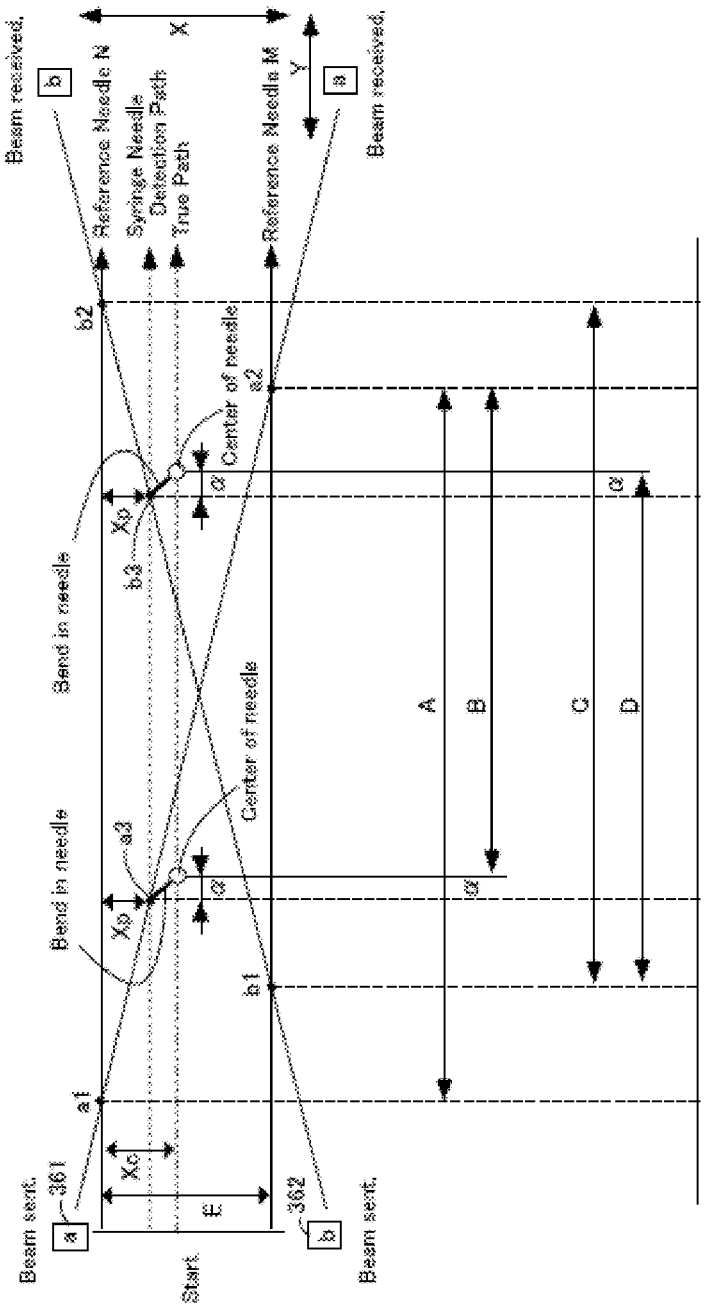
FIG. 25 is an explanatory chart illustrating a bent needle detection operation by the bent needle detection section in FIG. 23.

FIG. 25 is an explanatory chart for needle bend detection. As described, as an initial operation, the second robot arm 22 positions the reference needles N, M at a predetermined start point in the bent needle detection section 36; then simultaneously as a timer starts, the robot arm starts moving the reference member 363 at a constant speed in Y direction (which is a direction not parallel to the beam from the first optical sensor 361 nor to the beam from the second optical sensor 362). From the moving speed and timer values indicating when the sensors 361, 362 are turned ON/OFF, it is possible to obtain positional data (distance data) of Location a1 and Location a2; and Location b1 and Location b2. Assume that the distance between Location a1 to Location a2 is A, and the distance between Location b1 and Location b2 is C. Assume also that the reference needles N, M are spaced from each other by a distance E. Whereas the reference needle N passes a reference point in direction X, the reference needle M passes a point which is spaced from the reference point in direction X by the distance E.

Next, the second robot arm 22 grasps a syringe 11 which will be used in the actual coinfusion processing, and positions the syringe needle 11*c* at the predetermined start point in the bent needle detection section 36. Assume again, that this start point is away from the point of origin in direction X by a distance Xc (on a true path), and it is so designed that the syringe needle 11*c* will block the beams from the sensors 361, 362 by a portion of the needle closer to the tip. With these arrangements described above, the second robot arm 22 starts moving the syringe needle 11*c* in the direction Y at a constant speed, simultaneously as the timer is started. From the moving speed and timer values indicating when the sensors 361, 362 are turned ON/OFF, it is possible to obtain positional data (distance data) on the true path when the needle tip is about to pass Location a3 and Location b3 on a syringe needle detection path. Assume that the distance from Location a3 to Location a2 is B, and the distance from Location b1 to Location b3 is D. If there is no bend in the syringe needle 11*c*, the syringe needle detection path is identical with the true path (Xp=Xc).

FIG. 25 assumes that there is a bend toward the needle tip with respect to the center of the syringe needle 11*c* when viewed from the syringe plunger 11*b*. In this case, the needle tip side will path on a syringe needle detection path which is away from the true path. When this syringe needle detection path is at a distance Xp from the reference point in direction X, the syringe needle's bend component in direction X is given by Xc−Xp. Also, the syringe needle 11*c* has a bend component α in direction Y.

From A, B, E, and Xp, a mathematical expression Xp=E−E×B/A is obtained when the needle has no bend. Also, from C, D, E, and Xp, another mathematical expression is obtained as Xp=E−E×D/C. Further, from these two, there is obtained a mathematical expression B/A=D/C.

However, the distance B and the distance D are values on the syringe needle detection path, and therefore cannot be used as they are. Specifically, if the syringe needle 11*c* has a bend component α in direction Y, responses from the sensors 361, 362 are delayed from the timer start time by an amount equal to a distance represented by the component α, being later than Location a3. Therefore, the distance B must be changed to B+a. Therefore, a mathematical expression Xp=E−E×(B+α)/A is obtained. Likewise, responses from the sensors 361, 362 are delayed from the timer start time by an amount equal to a distance represented by the component α, being later than Location b3. Therefore, the distance D must be changed to D−α Therefore, a mathematical expression Xp=E−E×(D−α)/C is obtained.

Also, from (B+a)/A=(D−α)/C, there is obtained α=(A×D−B×C)/(A+C), which represents the amount of bend of the syringe needle 11*c* in direction Y. Then, placing the obtained value a, the expression Xp=E−E×(B+α)/A gives a value of Xp. Further, calculating Xc−Xp gives the amount of bend of the syringe needle 11*c* in direction X.

Based on the amount of bend obtained as the above, the controller 500 controls the second robot arm 22 to bring the needle tip onto a corrected position when inserting the needle through the coinfusion mouth of the transfusion bag 12. This makes it possible to inset the syringe needle onto an intended location. The needle bend inspection may be made each time a new syringe needle 11*c* is used, or may be made each time the syringe needle 11*c* is inserted through the coinfusion mouth of the transfusion bag 12 if the same needle is inserted a plurality of times. In the needle bend detection, it is also possible to obtain a time spent for passing across the beam (a length of time for which the sensor was turned off), to determine a diameter of the syringe needle 11*c* in order to make sure that there is no misuse of the syringe needle 11*c*.

The above described needle positioning based on timer start timing is not the only way. Robot arm coordinate values may be used to determine where the syringe needle 11*c* is. Additionally, there may also be an arrangement that the first optical sensor 361 is turned by 45 degrees on a horizontal plane for example, on a rotating disc without blocking the long hole 36*a*. This makes it possible to use the first optical sensor 361 as a substitute for the second optical sensor 362. In this case, the reference needle and the syringe needle 11*c* have to be moved in a plurality of times.

In the example described above, two optical sensors 361, 362 are used to detect a bend in direction X and a bend in direction Y of the syringe needle. However, it is also possible to detect the bend in direction X and the bend in direction Y of the syringe needle with only one optical sensor. Regarding the bend in direction X, it is possible to detect it with only one sensor (optical sensor 361 in this case) since Xp can be obtained from a ratio between the distance from a1 to a2 and the distance from a3 to a2 in FIG. 25. When obtaining the bend in direction Y, the syringe 11 is rotated around the axis of the syringe 11 by 90 degrees with the second robot arm 22, etc. and the above process of moving the syringe 11 along the true path as shown in FIG. 25 is repeated. In this case again, the bend in direction X is detected with only one optical sensor, but since the syringe 11 has been rotated by 90 degrees, the obtained bend is the bend in direction Y.

Still another alternative embodiment is to take images of the syringe needle 11*c* with a camera, and perform an image recognition process to detect bends in the needle.

Figure 26:
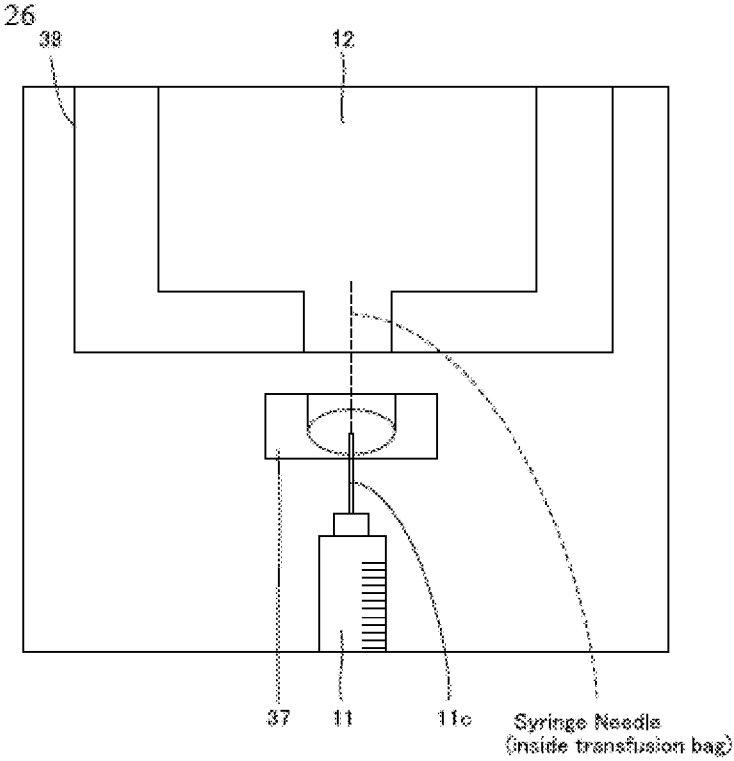
FIG. 26 is an explanatory sketch of an image obtained in an image taking operation made toward a needle insertion monitoring transparent window by a needle insertion monitoring camera of the coinfusion apparatus in FIG. 1.

When the syringe needle 11*c* is inserted through the coinfusion mouth of the transfusion bag 12, the controller 500 operates the needle insertion monitoring camera 44 to take an image in the direction toward the needle insertion monitoring transparent window 38. The needle insertion monitoring camera 44 takes an image to include the transfusion bag 12 which is outside the coinfusion processing room 104, and the syringe 11 (syringe needle 11*c*) which is inside the coinfusion processing room 104 within a single image. FIG. 26 is an example sketch of the image taken in this step. It is possible from this image, to check whether or not the tip side of the syringe needle 11*c* is inside the transfusion bag 12. The image can be displayed on the touch panel & monitor 14 for example. Also, the image is stored in the data storage section for a final inspection.

Figure 27:
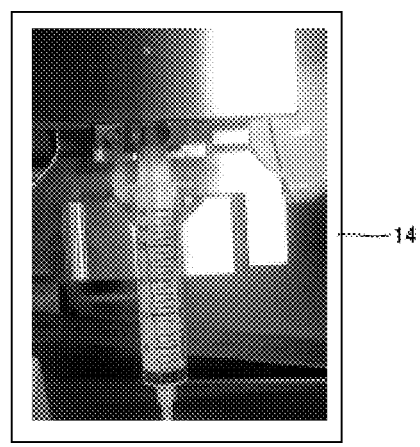
FIG. 27 is an explanatory image of a syringe taken by a syringe monitoring camera of the coinfusion apparatus in FIG. 1.

Once the transfusion is sucked, the second robot arm 22 moves the syringe 11 to a place for the syringe monitoring camera 42 to take an image. After this movement, the controller 500 operates the syringe monitoring camera 42 to take an image of the syringe 11. FIG. 27 is an example of the image taken in this step. It is possible from this image, to check presence/absence or an amount of transfusion inside the syringe needle 11*c*. The image can be displayed on the touch panel & monitor 14 for example. Also, the image is stored in the data storage section for a final inspection.

The coinfusion processing is brought to a successful end when, for example, an OK button, which is displayed on the touch panel & monitor 14 together with the images, is pressed. Then, the transfusion bag 12 is lowered by the transfusion bag elevation inclination section 113. The controller 500 releases the Open/Close lock of the preparation container take-out door 15 only when the OK button has been pressed as described, or when a final inspection OK button has been pressed. In other words, the preparation container take-out door 15 cannot be opened unless there is an inspection process and a human inspector issues an OK command. Of course it is possible to open the preparation container take-out door 15 for error correction processes. As has been understood, once a coinfusion processing is completed, the transfusion bag 12 is returned to the same preparation container 101, i.e., the original preparation container 101 that was placed in the main body section 300 of the coinfusion apparatus 1. This eliminates the need for a process of rewriting the patient information and medical agent information. Also, there is no need for preparing trays dedicated to the take-out process.

Figure 28:
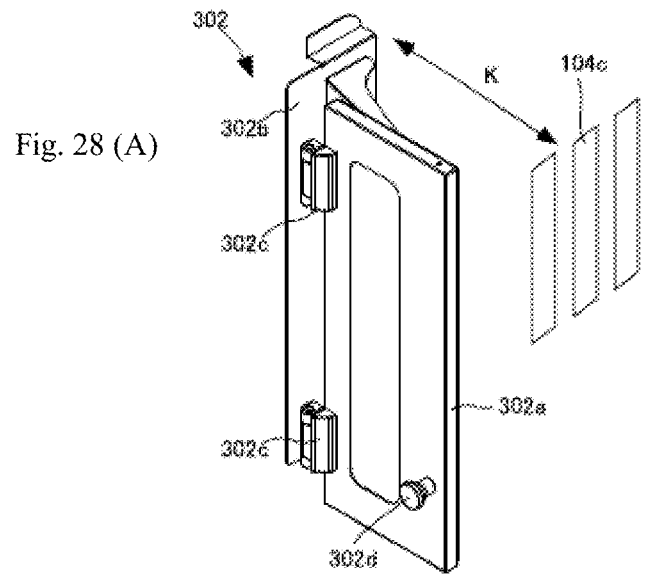
FIG. 28(A) and FIG. 28(B) are explanatory illustrations of a syringe take-out door of the coinfusion apparatus in FIG. 1.
Figure 28:
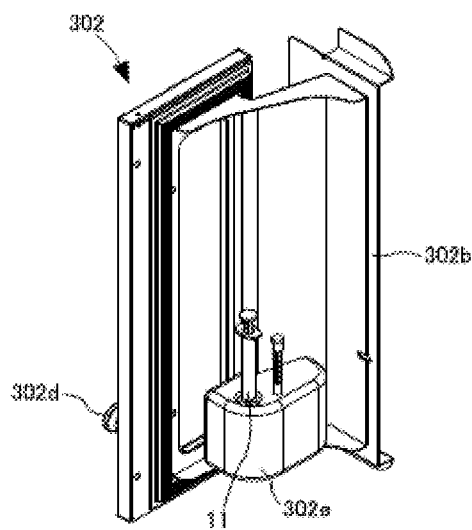

In addition to dispensing in the form of the transfusion bag 12 as described above, the syringe take-out door 302 can be used for dispensing in the form of a syringe 11. As shown in FIG. 28(A) and FIG. 28(B), the syringe take-out door 302 is made of a front door section 302*a* and a back door section 302*b* formed in a shape of a letter L, and is rotatable around vertical-axis hinges 302*c* to open/close an opening which leads to the coinfusion processing room 104. When the syringe take-out door 302 is opened, a syringe placement table 302*e*, which is provided on the back surface of the front door section 302*a*, comes out of the coinfusion processing room 104 while the back door section 302*b* closes the opening. The syringe take-out door 302 is opened/closed with a door knob 302*d* by a human operator.

As has been explained further above, the air supply system which supplies clean air to the coinfusion processing room 104 has its air supply opening formed in the ceiling of the coinfusion processing room 104. The slits 104*b* for sucking air to lower the air pressure inside the coinfusion processing room 104 are formed in a side surface of the coinfusion processing room 104. The syringe take-out door 302 is located across an air flowing path from the ceiling toward the slit 104*b*. Thus, a body of air between the front door section 302*a* and the back door section 302*b* (air inside the coinfusion processing room 104 when the door is opened; and outside air when the door is closed) is drawn quickly through the slits 104*b*, minimizing the amount of air escaping from the coinfusion processing room 104 and the amount of outside air coming into the room 104.

In the present embodiment, the syringe take-out door 302 is provided at a higher position than the slits 104*b*. Suction slits 104*c* dedicated to the syringe take-out door 302 are provided at a higher position than the slits 104*b*. The dedicated suction slits 104*c* are formed at a height to overlap the height range of the syringe take-out door 302, or at a height lower than the syringe take-out door 302. Preferably, a horizontal distance K between the back door section 302*b* and the side wall in which the dedicated suction slits 104*c* (the slits 104*b*) are formed should be within 200 mm (desirably within 150 mm or 100 mm).

The syringe take-out door 302 is not limited to the example described above; for example, it may be an L-shaped door pivotable around lateral-axis hinges. In this case, the horizontal distance between the edge of the L-shaped door closer to the slits and the side wall in which the slits 104*b* are formed should be within 200 mm (desirably within 150 mm or 100 mm) Also, the syringe take-out door 302 in this case should be desirably formed at a height overlapping a height range of the slits 104*b*.

As an alternative arrangement, a sucking force from the dedicated suction slits 104*c* and/or the slits 104*b* may be increased for a predetermined length of time upon closure of the syringe take-out door 302. Location of the syringe take-out door 302 is not limited to the main door 301. The syringe placement table 302*e* may be on the front side of the back door section 302*b*.

On the stand-by rack 33, syringes 11 (syringe main bodies 11*a*) without syringe needles 11*c* are temporarily stored with their neck sections facing downward. The stand-by rack 33 is formed with neck holding holes for the neck sections to fit in. The neck sections have generally the same diameter regardless of the liquid holding capacity of the syringes 11, so the neck holding holes are not dedicated to a specific size of the syringe main body 11*a* but common to all, having a predetermined diameter.

It is preferable that the stand-by rack 33 is accessible by whichever of the first robot arm 21 and the second robot arm 22. The stand-by rack 33 is not installed on a floor surface of the coinfusion processing room 104. This makes it possible to flatten the floor surface of the coinfusion processing room 104.

As has been explained further above, the container conveying section 110 transfers the preparation container 101 from a place near the first robot arm 21 to a place near the second robot arm 22. In the present embodiment, simultaneously with this transfer operation, at least one of the first robot arm 21 and the second robot arm 22 is performing a task. For example, the first robot arm 21 and the second robot arm 22 are working together to attach a syringe needle 11*c* to a syringe main body 11*a*. Thus, while the preparation container 101 is being moved from the place near the first robot arm 21 to the place near the second robot arm 22, the time spent for the transfer is also utilized to proceed with preparation for the upcoming coinfusion processing inside the coinfusion processing room 104. This makes it possible to reduce operation time.

As described above, the container conveying section 110 transfers the preparation container 101 from a place near the first robot arm 21 to a place near the second robot arm 22. With this, in the present embodiment, the main door 301 or the trash storage room door 13 is sandwiched by the communication mouth 114 (preparation container entrance) and the preparation container take-out door 15 (preparation container exit). If the preparation container entrance and the preparation container exit were made side-by-side in a close proximity, there is a high risk of confusion over the entrance and the exit. However, if the preparation container entrance and the preparation container exit are placed to sandwich the main door 301 or the trash storage room door 13, the confusion over the entrance and the exit is less likely to happen. Alternatively, the preparation container take-out door 15 (preparation container exit) may be formed on the left side surface of the main body section 300. Similarly, the communication mouth 114 (preparation container entrance) may be formed in the front surface of the main body section 300.

As described, the agitator 32 is on one side of the trash lid 132a (on the side closer to the first robot arm 21) whereas the weighing device 35 is on the other side of the trash lid 132a (on the side closer to the second robot arm 22). This configuration allows designing both of the first robot arm 21 and the second robot arm 22 to have a capability to access the trash lid 132a. On the other hand, this configuration assumes that the agitator 32 is only accessed by the first robot arm 21, which allows optimal design that takes operational characteristics of the container retention section 25 into account. Likewise, the weighing device 35 is only accessed by the second robot arm 22, which allows optimal design that takes operational characteristics of the syringe handling section 26.

The configuration in which the weighing device 35 is accessed only by the second robot arm 22 is efficient. Once the syringe 11 has been weighed by the weighing device, then there is no need for passing it between the first and the second robot arms 21, 22 before inserting it into the transfusion bag 12.

The sterilizing lamps 45 are turned on, e.g., at about three hours before starting a coinfusion processing. One of the sterilizing lamps 45 is between the first and the second robot arms 21, 22, so there is less amount of sterilizing light blocked by the first and the second robot arm 21, 22. This makes it possible to provide uniform sterilization inside the coinfusion processing room 104.

If a medical agent container 10 with a label applied thereto is grasped strongly, the label can be peeled off the container. Therefore, these containers should be grasped with a smaller force than used for medical agent containers 10 without labels. Grasping with a smaller force is not likely to cause problems since the label reduces slippage. Presence or absence of a label can be known from information in the master table.

In the present embodiment, two robot arms 21, 22 are installed inside the coinfusion processing room 104. However, in other alternative embodiments, three or more robot arms may be installed inside the coinfusion processing room 104.

Figure 29:
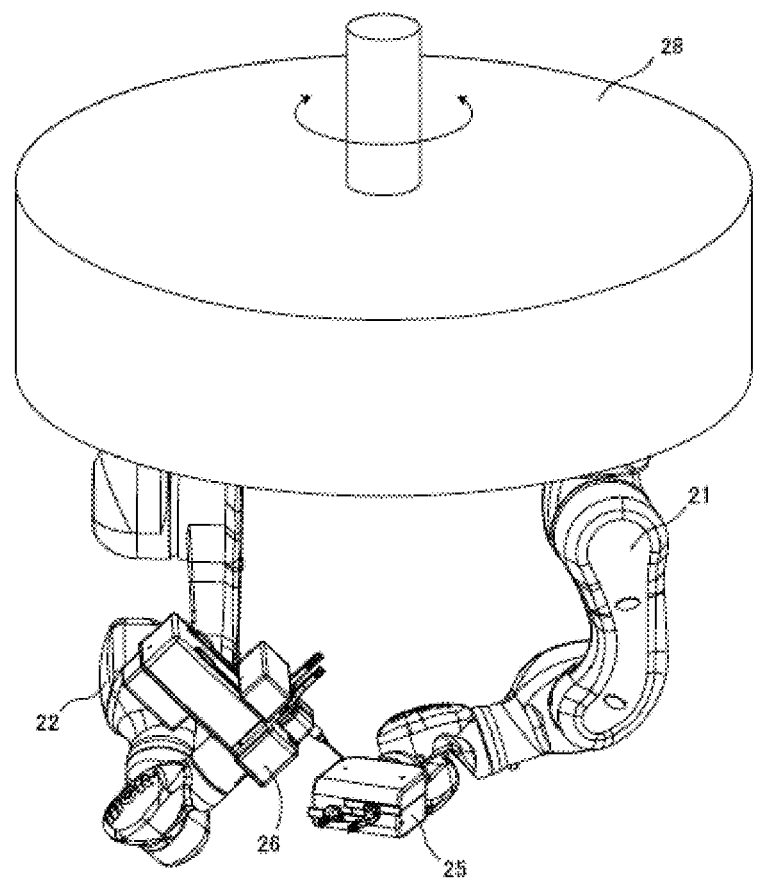
FIG. 29 is a perspective view illustrating rotatable robot arms.

The first and the second robot arms 21, 22 may be installed on a rotatable disc 28 as shown in FIG. 29. As the disc 28 is turned, relative location of the first and the second robot arms 21, 22 with respect to the coinfusion processing room 104 is changed without changing positional relationship between the first and the second robot arms 21, 22. This makes it easy to perform precision tasks by using the first and the second robot arms 21, 22.

Figure 30:
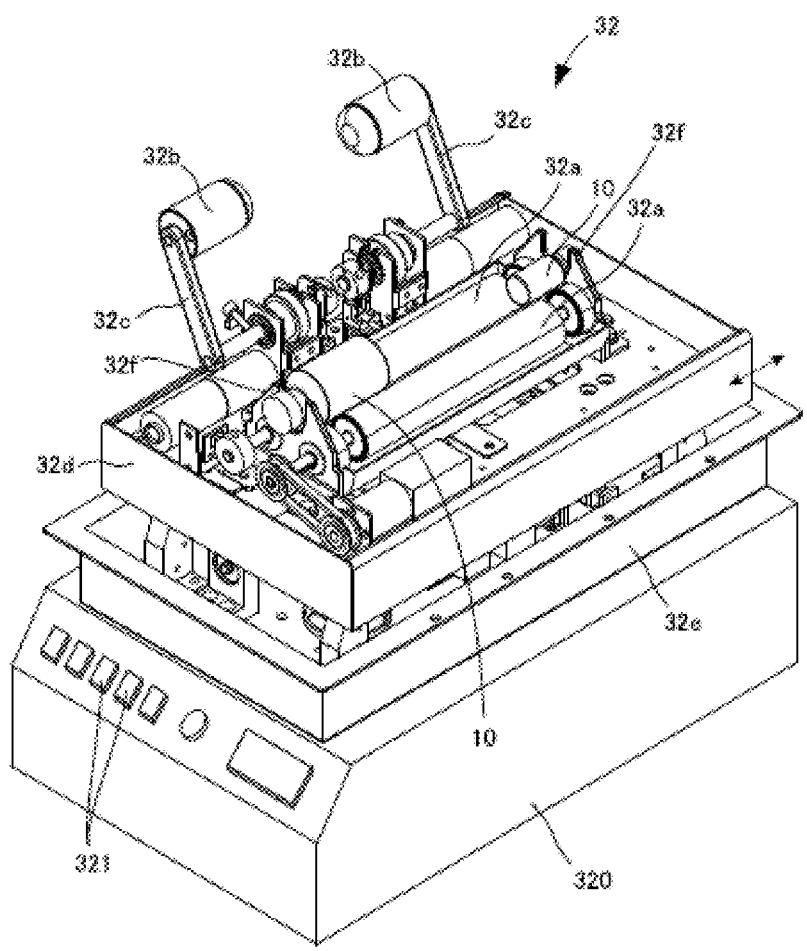
FIG. 30 is an explanatory view illustrating a stand-alone agitator including the agitator shown in FIG. 18.

FIG. 30 shows an example of a stand-alone agitator provided by the agitator 32 placed on a control box 320. The control box 320 has various buttons 321 including: a button to adjust rotational speed of the rollers, a button to set agitation time, a button to enable/disable horizontal oscillation, a button to enable/disable vertical oscillation; as well as volume controls, etc.

In the embodiments described-above, the coinfusion processing is performed by the robot arms 21, 22. However, an operation to retain and rotate the syringe 11, for example, may be performed by the rotation mechanism disclosed in Patent Literature 1 or Patent Literature 2, for example.

In the present embodiment, the coinfusion apparatus 1 has two power supply systems. One of the systems is for normal use (when there is no electric power outage). The other system is used in case of a power outage, for receiving electric power supply from a backup power source of the medical facility where the coinfusion apparatus 1 is installed. The coinfusion apparatus 1 is capable of detecting power outages. It is possible to determine if there is a power outage or not by checking, for example, if there is power supplied from the first power supply system (the one for normal use). In case of a power outage, the coinfusion apparatus 1 obtains power supply from the other power supply systems (backup power source) until it completes an ongoing process (for example, a process from the step of reading an IC tag on a preparation container 101 to the step of injecting a coinfusion liquid medical agent into a transfusion bag 12) and thereafter, comes to a stop. This ensures that ongoing processes are not stopped on their way. In a case where the coinfusion apparatus 1 comes to a stop but there is still another coinfusion prescription which must be performed, coinfusion processing can be performed manually. This helps reducing power consumption while the power comes from the backup power source.

In one embodiment, there may be a configuration that, during the time in which the shutter 111 inside the coinfusion processing room 104 is open, the coinfusion apparatus 1 increases a sucking power of the slits 104b more than the period when it is closed, to reduce a pressure inside the coinfusion processing room 104. This configuration enhances prevention of air escape from inside the coinfusion processing room 104 to the container conveying section 110 during the time when the shutter 111 is open. A similar configuration may be employed for cases where the coinfusion communication mouth 37 has a shutter; namely, during the time when the shutter in the coinfusion communication mouth 37 is open, the sucking power of the slits 104b is increased more than the period when it is closed, to reduce the pressure inside the coinfusion processing room 104. Also, when the sealing trash lid 132a is open, the coinfusion apparatus 1 may increase suction through the air discharge path 133 on the side surface of the trash chute tube 132 and the air discharge path 134 in the trash storage room 13a for the period when the lid is closed, to enhance prevention of air from coming into the coinfusion processing room 104 through the trash bag and the trash storage room 13a.

The first and/or the second robot arm 21, 22 may be equipped with the medical agent bar code reader 34 and a load cell for weighing medical agents. Utilizing the load cell provides an advantage that it gives the weight of medical agent sucked into a syringe right at the time when the medical agent is sucked.

Alternatively, for example, a load cell may be provided at the hook section 113a of the transfusion bag elevation inclination section 113 for weighing the transfusion bag, or a load cell may be provided at the medical agent bar code reader 34 for weighing the medical agent container. The load cell in the medical agent bar code reader 34 can measure the amount of medical agent removed, and the load cell in the transfusion bag elevation inclination section 113 can make a measurement to make sure that the weight is increased and therefore the coinfusion was made properly. In this arrangement it is possible to eliminate the weighing device 35 in the coinfusion processing room 104.

After a coinfusion process, the mouth of used transfusion bag is possibly contaminated with the medical agent, so it is a good idea to clean the coinfusion mouth with a cleaning tool after the coinfusion. For example, a cleaning tool stored inside the coinfusion processing room 104 is picked up by the second robot arm 22, and the second robot arm 22 performs the cleaning task. Alternatively, a disposable cleaning tool may be supplied in the preparation container 101 for the second robot arm 22 to pick up directly or indirectly via the first robot arm 21, so that the cleaning task is performed by the second robot arm 22. Also, the disposable cleaning tool may be stored temporarily on the stand-by rack 33. After the use, the disposable cleaning tool may be discarded into the trash box 131.

Also, a sterilizing tool or a disposable sterilizing tool may be prepared so that the first robot arm 21 or the second robot arm 22 picks up the sterilizing tool and performs a sterilizing step of the coinfusion mouth and the syringe before beginning the coinfusion operation. Further, there may be a sterilizing step of having the robot arms sterilizing each other.

Still further, the first and the second robot arms 21, 22 and the agitator 32 may be operated simultaneously so that, for example, while the agitator 32 agitates a medical agent which needs agitation, the first and the second robot arms 21, 22 inject a medical agent which does not require agitation into the transfusion bag 12.

Further, the first robot arm 21 or the second robot arm 22 may hold and revolve an ampule, thereby forcing any small amount of liquid medical agent which may remain at the head section (neck section) of the ampule to fall into the ampule main body, before the head section of the ampule is cut by the ampule cutter 31.

The ampule cutter 31 which uses a file may be substituted by a flame cutting device which uses a flame of hydrogen gas to cut the ampules. Hydrogen gas only produces water when it is burnt, so there is no risk of contaminating the coinfusion processing room 104. Also, flame cutting is melting cutting, which provides an advantage of not producing any filing dust.

Figure 31:
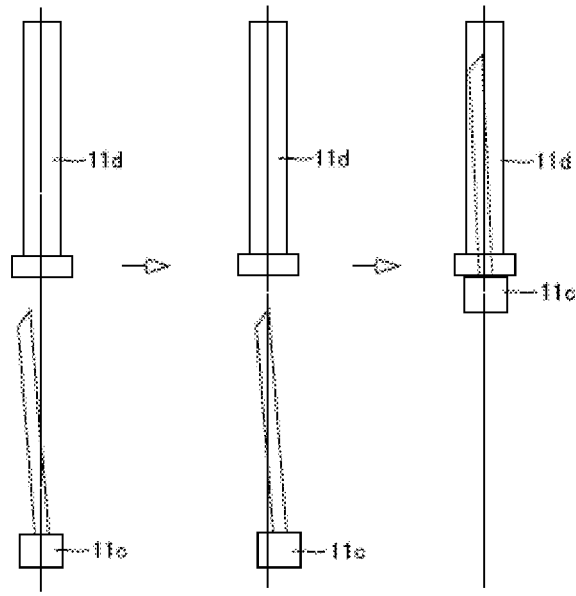
FIG. 31 is an explanatory view illustrating an embodiment of the present invention, showing steps of inserting a bent syringe needle into a cap.
Figure 31:
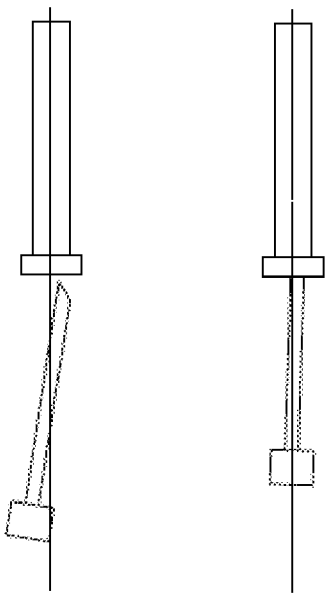

In a case where a syringe 11 has a bent syringe needle 11c, the bent needle detection section 36 can detect the bent. Therefore, results of the bend detection can be utilized when inserting the syringe needle 11c into the needle cap 11d. Specifically, as shown in FIG. 31(A), the needle tip sometimes does not enter the needle cap 11d if alignment is made between the base center of the syringe needle 11c and the entrance center of the needle cap 11d. Therefore, the needle tip is positioned at the entrance center of the needle cap 11d, through an adjustment according to the extent of bend in the syringe needle 11c; i.e., relative position between the syringe needle 11c and the needle cap 11d is adjusted and then the tip of the syringe needle 11c is inserted into the needle cap 11d. Then, as the syringe needle 11c comes midway through, an additional adjustment is made to align the base center of the syringe needle 11c with the entrance center of the needle cap 11d, before insertion is completed. This operation can be achieved, for example, by using the second robot arm 22 and the syringe needle attaching/detaching device 43.

The needle cap 11d which is a molded component has a somewhat distorted shape depending on the manufacturer. This can lead to a failure that an attempt of inserting the syringe needle 11c straightly into the needle cap 11d is not successful. It is desirable, therefore, that as shown in FIG. 31(B), the axis of the syringe needle 11c is slightly skewed, with the needle tip being aligned with the center of the opening and then, the needle begins to be advanced while the skewed axis is gradually brought in the straight position. This method increases the rate of successful insertion although the orientation of the needle tip cut surface still plays some role in success or failure.

Figure 32:
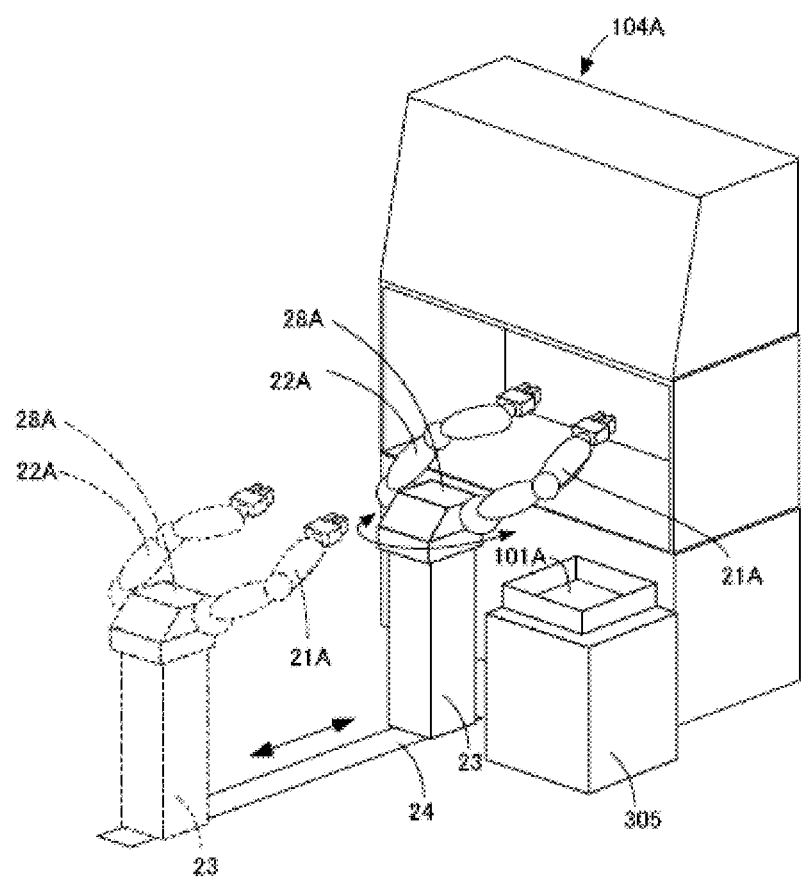
FIG. 32 is an explanatory view illustrating an embodiment of the present invention, showing a coinfusion apparatus including a commonly available safety cabinet and a floor type two-arm robot.

In the embodiments described thus far, the first and the second robot arms 21, 22 are placed inside the coinfusion processing room 104. However, this is not limiting. The coinfusion apparatus of the category being discussed can also be implemented, as shown in FIG. 32 for example, by using a commonly available safety cabinet 104A; and the first and the second robot arms 21, 22 provided by floor type robot arms 21A, 22A placed outside of the safety cabinet 104A so that the first and the second robot arms 21A, 22A have their access into the coinfusion processing room of the safety cabinet 104A through an opening. Also, similarly to the structure shown in FIG. 29, the first and the second robot arms 21A, 22A may be installed on a rotation support section 28A which is rotatable on a main body section 23. Specifically, the first and the second robot arms 21A, 22A may be provided as a two-arm robot having a swivel axis in its main body section 23. Also, any of these first and the second robot arms 21A, 22A may have seven or more operational axes.

As the first and the second robot arms 21A, 22A perform inside the coinfusion processing room 104, there is possibility that the first and/or the second robot arms 21A, 22A will be contaminated by medical agents. Taking the contaminated first and the second robot arms 21A, 22A out of the coinfusion processing room without any process is dangerous. It is preferable, therefore, that the first and the second robot arms 21A, 22A go through a certain cleaning process that, for example, the first and the second robot arms 21A, 22A are sterilized with the sterilizing lamp 45, before the first and the second robot arms 21A, 22A are taken out of the coinfusion processing room 104. The first and the second robot arms 21A, 22A may also be cleaned before being brought inside the coinfusion processing room 104. For example, the first and the second robot arms 21A, 22A may be cleaned outside of the coinfusion processing room 104. With this, the first and the second robot arms 21A, 22A are cleaned of smears attaching thereto while they are outside of the coinfusion processing room 104 before they are introduced into the coinfusion processing room 104. This ensures that the coinfusion processing room 104 is not contaminated, and coinfusion processes are performed under safe conditions.

The coinfusion apparatus 1 may have a rail system 24 so that the first and the second robot arms 21A, 22A can be brought closer to or farther away from the safety cabinet 104A while they are on the main body section 23.

A table 305 may be provided near the first and the second robot arms 21A, 22A for placing a preparation container 101A in which syringes, etc. are set, so that the robot arms or the conveyor can bring the preparation container 101A into the safety cabinet 104A. Further in this embodiment, the transfusion bag 12 used in the coinfusion may be returned to the same preparation container 101.

Figure 33:
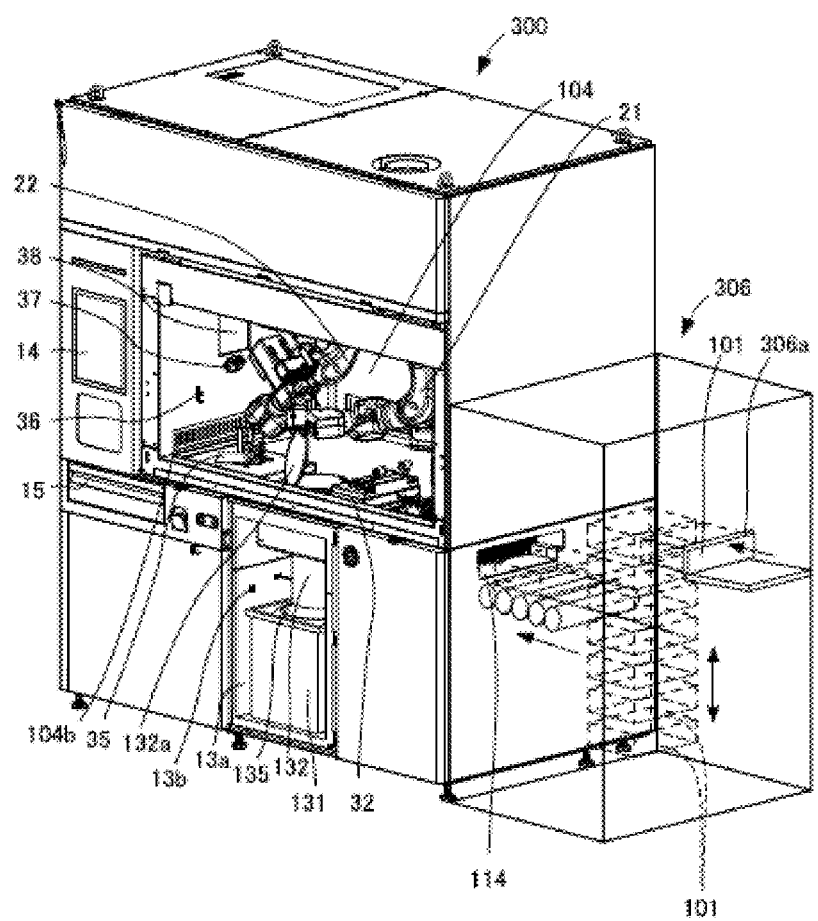
FIG. 33 is an explanatory illustration of a coinfusion apparatus including a stocker, according to an embodiment of this invention.

In yet another alternative embodiment, the coinfusion apparatus 1 includes a stocker which stores a plurality of preparation containers each containing a set of medical agents and transfusion bags for one patient. For example, as shown in FIG. 33, a stocker 306 may be provided, and each time a preparation container 101 is ready, loaded with medical agents and a transfusion bag 12 for a patient, then it is put through an entrance 306a. Each preparation container 101 has a wireless tag (e.g., RFID), a bar code or the like attached to identify the intended patient, so that it is possible to know where on the stocker 306 is any particular preparation container 101 for a particular patient. Once the stocker 306 receives an assignment of a patient (ID) from the main body section 300 of the coinfusion apparatus 1, then the stocker moves a preparation container 101 for this particular patient to a height of the communication mouth 114 in the main body section 300, and brings the preparation container 101 into the communication mouth 114 by means of a conveyor for example.

The transfusion bag 12 is usually made of flexible film, but sometimes it is a plastic bottle formed of a hard material. These plastic bottles do not bulge, so once a liquid medical agent is injected into a plastic bottle which has an atmospheric pressure inside, the inside pressure of the plastic bottle becomes positive. A problem with such a positively pressurized bottle is that the liquid medical agent can splash out of the plastic bottle when a nurse inserts a needle through a rubber cap of the plastic bottle.

To avoid this, an amount of air or a fluid replacement is removed from the plastic bottle by using a syringe to reduce the pressure inside the plastic bottle to negative. Then, a liquid medical agent in an ampule is drawn into the syringe 11, and using this syringe 11, the liquid medical agent is injected into the plastic bottle of the negative pressure. The syringe monitoring camera 42 may take a picture of the syringe 11 under this injection stage (i.e., a state where the plunger 11b is being pressed into the syringe main body 11a). This method requires a greater number of needle insertions since the needle is inserted through the rubber cap for an additional time for the sole purpose of removing air from the plastic bottle. An empty container may be provided in the preparation container 101, so that the removed fluid replacement can be disposed of into the empty container.

There is another method, in which air or a fluid replacement is not removed from the plastic bottle using a syringe but a liquid medical agent from an ampule is injected with the syringe 11 into the plastic bottle which has an atmospheric internal pressure, for example. In this case, the pressure inside the plastic bottle becomes positive, so air is removed from inside the plastic bottle to bring the inside pressure back to atmospheric. In this method, the syringe monitoring camera 42 may take a picture of the syringe 11 (under a state where the plunger 11b is being pressed into the syringe main body 11a) before removing the air to bring the internal pressure back to atmospheric. This method provides an advantage that the number of times for inserting the needle through the rubber cap of the plastic bottle does not increase.

The problem when using the plastic bottle can also happen when a transfusion bag 12 of a flexible film is bulged to its full extent. One of the preferred methods described above may be specified in the detailed prescription information so that the selected method is performed based on the detailed prescription information.

Figure 34:
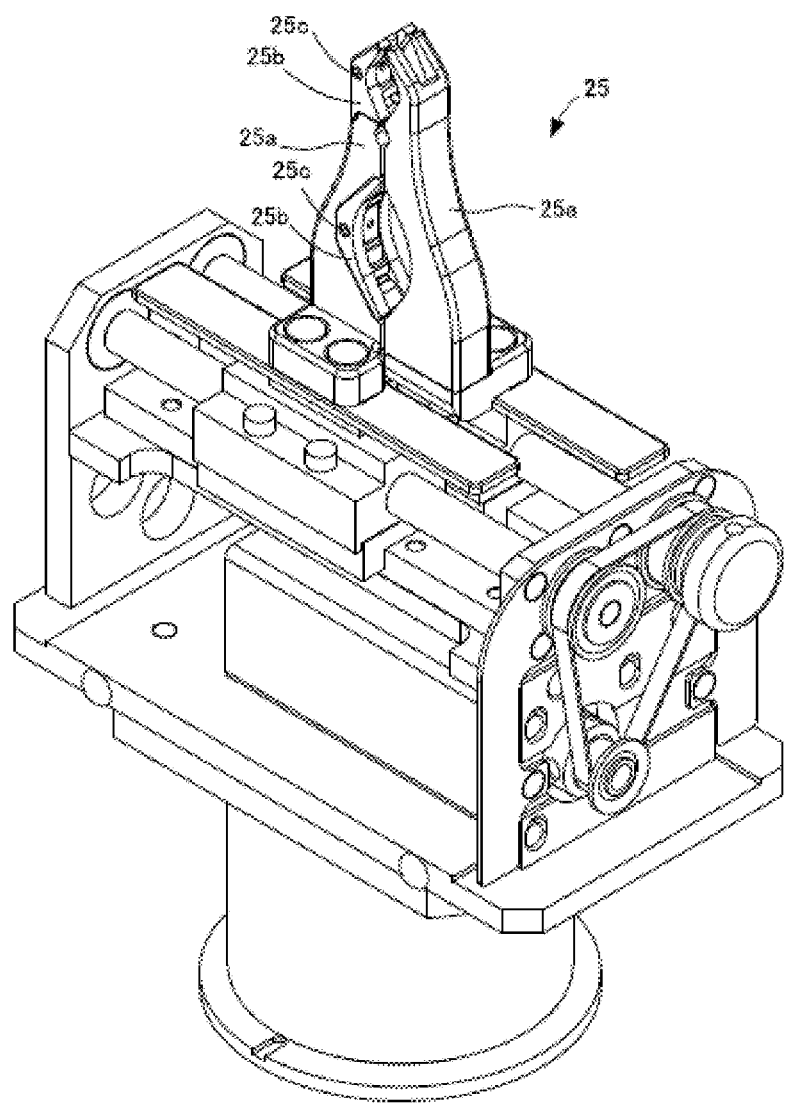
FIG. 34 is a perspective view illustrating another example of the container retention section attached to the first robot arm of the coinfusion apparatus in FIG. 1.

FIG. 34 shows a variation of the container retention section 25 in the first robot arm 21. This container retention section 25 holds a body section of the medical agent container 10 using four points of contact, i.e., two points of contact made by a generally V-shaped concaved grip section 25b of one of the grip nails 25a, and two points of contact made by a generally V-shaped concaved grip section of the other of the grip nails 25a. The concaved grip section 25b is supported by means of a pin 25c having its axis set perpendicular to the direction in which the grip nails 25a are moved (direction of the grasping action), so it is capable of pivoting within a plane containing the direction of grasping action. In other words, the first robot arm 21 has a pair of concaved grip sections 25b for making contact when holding the medical agent container 10, and one of the concaved grip sections 25b is movable. Instead of using the pin 25c, an elastic member may be used which allows movement of one of the concaved grip sections 25b.

The medical agent container 10 has a range of variability in its roundness from one container to another; however, since the concaved grip section 25b is pivotable, appropriate retention of the medical agent container 10 is possible. Also, even if shape irregularity in the medical agent container 10 or label thickness might pose a likelihood that contact for holding the medical agent container 10 will not be made appropriately, the concaved grip sections 25b is capable of pivoting within the plane containing the direction of grasping action, making sure that the contacts are made appropriately, resulting in appropriate holding of the medical agent container 10.

In the structure shown in FIG. 34, the concaved grip section 25b, i.e., a movable section moved by contact with the medical agent container 10, is provided at two locations, i.e., at the ampule grip section on the tip side and at the vial grip section on the base side. However, this is not limiting.

There may be another configuration in that components inside the coinfusion processing room 104 are detachable, and at least one of the robot arms 21, 22 is capable of grasping the components to confirm presence of the components. According to this arrangement, if an attempt to grasp the component is successful, resulting in actual grasping of the component, this confirms that the component is present. This configuration eliminates the need for sensors necessary to confirm the presence of the components.

The attempt to grasp the component is made at a location of registered coordinate values. The controller 500 moves the robot arms to a specific location indicated by the coordinate values. In case where a component which is supposed to be attached is not attached, then the pair of grip nails 25a in the container retention section 25 has a zero distance between them. Therefore, when it is determined that the distance between the pair of grip nails 25a is zero or smaller than the known thickness of the component judging from operating conditions (driving pulse, driving time, etc.) of the motor 251 which drives the grip nails 25a, then it is determined that the component is not attached. Examples of the component include the syringe placement table 35a which is placed on the weighing device 35, and any object which is placed on the stand-by rack 33. The above-described confirmation operation is performed, for example, during a period from the time when the coinfusion apparatus is turned ON to the time the coinfusion operation is started.

Figure 35:
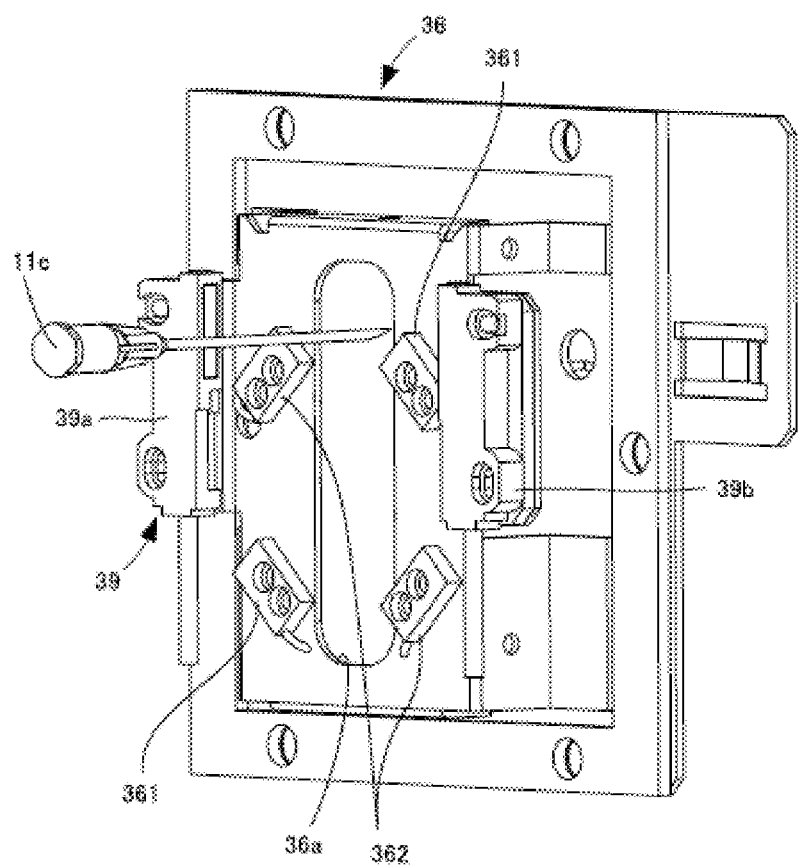
FIG. 35 is a perspective view illustrating a bent needle detection section equipped with a needle tip detection section as a variation of the bent needle detection section in FIG. 23.

There may be provided, as shown in FIG. 35, a needle tip end detection section 39 inside the bent needle detection section 36 of the coinfusion processing room 104 for example, for detection of an axial tip end position of the syringe needle 11c attached to the syringe 11. According to this embodiment, an accurate distance can be obtained from the position in the syringe 11 grasped by the second robot arm 22 to the tip of the syringe needle 11c. The needle tip end detection section 39 can be provided by an area sensor which includes a beam transmitter section 39a and a beam receiver section 39b aligned to cross perpendicularly to the axis of the syringe needle 11c. In this way, the controller 500 uses the second robot arm 22 to slowly move the syringe 11 axially of the needle while monitoring an output from the needle tip end detection section 39. When there is a change detected in the output, the tip position of the syringe needle 11c with respect to the syringe grasping position of the syringe handling section 26 can be determined. Then, if the tip position of the syringe needle 11c with respect to the syringe grasping position of the syringe handling section 26 does not match an expected position, the controller 500 can pick the difference between the two locations as a correction value to perform corrections in operations thereafter. This correction improves accuracy in the amount of sucked liquid medical agent.

Other embodiment may provide the needle tip end detection section 39 at a place other than the bent needle detection section 36.

When the second robot arm 22 operates the syringe handling section 26 to suck a transfusion or a liquid medical agent into the syringe 11, the sucking action may be made to an extent necessary for sucking a greater amount than specified in the detailed prescription information. This helps when friction between a rubber tip of the plunger 11b and an inner wall of the syringe main body 11a interferes with precise sliding movement of the plunger rubber tip following a drawing of the plunger 11b: After the syringe handling section 26 has drawn the plunger 11b, the syringe handling section 26 pushes the plunger 11b back to the position that matches the specified amount of liquid. This ensures that there is the specified amount of liquid in the syringe main body 11a. For example, there can be a case where syringes to be used for the task tend to allow the plunger tip rubber to move by approximately 2 mm. Then, the setting for the amount of drawing should be made in advance so that the plunger 11b will be drawn in excess of the amount necessary for sucking the amount specified in the detailed prescription information, by 3 mm for example. Under this setting, the second robot arm 22 operates the syringe handling section 26 to perform a drawing process of sucking the transfusion or the liquid medical agent and thereafter, pushes the plunger 11b by 3 mm.

The weighing device 35 may have accuracy settings so that a lower accuracy is used as the amount sucked in syringe 11 increases. A principle behind this is that a longer time is required as a higher accuracy is required in the weighing device 35, whereas a lower accuracy is required as the amount sucked in the syringe 11 increases. Thus, if the weighing device 35 has accuracy settings so that a lower accuracy is used as the amount sucked in the syringe 11 increases, it becomes possible to avoid increase in the measuring time which is unavoidable if the weighing device 35 has a fixed accuracy setting regardless of the amount of liquid. Changing the accuracy setting in the weighing device 35 can be achieved by changing a range of measurement, which is one of the fundamental features of the weighing device 35, from one setting to another. For example, the controller 500 determines the amount of liquid to be sucked into the syringe 11 based on the detailed prescription information and selects a first range if the amount exceeds 50 ml, but selects a more accurate second range if the expected amount of liquid is not more than 50 ml. Obviously, the selection from two options does not limit the present invention. Three or more range options may be provided. There can also be a case where sucking of liquid medical agent is performed from a plurality of medical agent containers 10 by using a single syringe 11, in which case the amount of liquid increases stepwise. In such a case, the range may be changed in accordance with the increase. Alternatively, the weighing device 35 can be utilized at different accuracy levels without changing the measurement range in the weighing device 35. For example, when the expected amount of liquid exceeds 50 ml, the controller 500 finalizes a measured value as soon as the first decimal digit has stabilized whereas a final value is obtained only after the second decimal digit has stabilized when the expected amount is not more than 50 ml. As a simpler method, the number of decimal digits from which a final value is obtained may be changed depending upon the weight of the object being weighed (wait for more digits for a lighter weight).

After the syringe 11 is brought into the coinfusion processing room 104 but before a sucking action is made to suck the transfusion or the liquid medical agent, the plunger 11b of the syringe 11 may be pushed into the syringe main body 11a in the coinfusion processing room 104. In this embodiment, the pushing action eliminates any gap in a case where the syringe 11 which is brought into the coinfusion processing room 104 is used while there is a gap remaining between the tip of the syringe plunger 11b and the tip-side inner wall of the syringe main body 11a. If the gap exists, sucking of the transfusion or the liquid medical agent is started from a wrong starting point (point of origin), which means that an accurate sucking operation is not performed. On the contrary, the arrangement described above ensures an accurate sucking operation. Determination on whether or not the plunger 11b of the syringe 11 has been pushed completely into the syringe main body 11a inside the coinfusion processing room 104 can be made, for example, by checking if a torque load in the motor which drives the transfer section 263 of the plunger retention section 262 in the syringe handling section 26 has reached a predetermined value. The gap elimination operation may be performed at any time as far as the syringe 11 is in the coinfusion processing room 104 and the sucking operation to suck a transfusion or a liquid medical agent has not been started yet. For example, the timing may be before a syringe needle 11c is attached to the syringe 11 or after a syringe needle 11c is attached.

Another way to perform the gap elimination operation is to use the transfer section 263 of the plunger retention section 262 while the syringe main body 11a of the syringe 11 is held by the syringe handling section 26 of the second robot arm 22. This method takes advantage of the original role of the second robot arm 22 to hold the syringe main body 11a of the syringe 11, so the method leads to a shorter time required for the gap elimination operation. The gap elimination operation may be performed under a state where the pair of grip nails 262a for holding the flange section of the plunger 11b take a grasp on the flange section, or under a state where the flange section is not grasped but the pair of grip nails 262a are closed, so that the grip nails 262a are pressed onto the flange section to push the plunger 11b into the syringe main body.

In an embodiment where the preparation container 101 is brought to a setting position which is outside of the coinfusion processing room 104 (for example, below the tray-path opening 104a), the controller 500 may perform the following process:

First, the controller 500 transfers the medical agent tray 102 from the preparation container 101, which is set at the above-described set position, to inside of the coinfusion processing room 104. Then, the controller 500 passes the transfusion bag retention section 103 from the preparation container to the transfusion bag elevation inclination section 113, which is the holding operation section for holding the transfusion bag for the needle insertion. Please note that the medical agent tray 102 is left inside the coinfusion processing room 104. In the next step, the controller 500 returns the preparation container 101, without the transfusion bag retention section 103, to the said setting position. And, at last, the controller 500 returns the medical agent tray 102 to the preparation container 101, which was returned to the said setting position. It should be understood that the preparation container 101 holds the medical agent tray 102 in a movable manner, and it is possible to expose the medical agent tray 102 to inside of the coinfusion processing room 104. Moreover, the medical agent tray 102 and the transfusion bag retention section 103 which are provided in the preparation container 101 are detachable.

This arrangement is advantageous when injecting a transfusion from the transfusion bag 12 into a medical agent container (vial container) 10 which contains a powder medical agent using a syringe 11. Such arrangement makes it possible to pass the transfusion bag retention section 103 to the transfusion bag elevation inclination section 113 while other processes are underway, such as taking the syringe 11 and the medical agent container 10 out of the medical agent tray 102, and setting the syringe 11 to the second robot arm 22. By the time the syringe 11 is ready to suck the transfusion from the transfusion bag 12, the transfusion bag retention section 103 has already been passed to the transfusion bag elevation inclination section 113. Therefore, the second robot arm 22 which already has the syringe 11 can immediately start the process of sucking the transfusion from the transfusion bag 12. Additionally, such arrangement makes it possible to return the emptied medical agent tray 102 to the preparation container 101 which has been returned to the said set position.

The above-described process may be performed only when a powder medical agent is in the medical agent container (vial container) 10, which is set in the medical agent tray 102, and the transfusion bag 12 is set in the preparation container 101. As an alternative, the above-described set of conditions may be obtained from the detailed prescription information and determined by the controller 500. In the above-described embodiment, the tray elevating section 112 raises/lowers the medical agent tray 102. The tray elevating section 112 include, for example, four shafts 112a which are movable in an up-down direction to lift the medical agent tray 102 from a lower position to a higher position. The lower surface of the preparation container 101 is formed with through-holes for four shafts 112a to pass through. After the shafts 112a have lifted the medical agent tray 102 from below, the medical agent tray 102 is supported on its edge by unillustrated support fingers provided in the container conveying section 110.

The support fingers are movable by means of an actuator such as an electromagnetic solenoid. After the medical agent tray 102 is supported by the support fingers, the shafts 112a are lowered, so that the preparation container 101 can be moved on the container conveying section 110. After the preparation container 101 is returned to the setting position, the shafts 112a are raised to support the medical agent tray 102, the support fingers are retracted, and then the shafts 112a are lowered, whereby the medical agent tray 102 is returned to the preparation container 101. The container conveying section 110 may be formed with grooves for the shafts 112a to pass through. Then, it becomes possible to move the container conveying section 110 without lowering the shaft 112a and with the medical agent tray 102 being exposed to the inside of the coinfusion processing room 104.

Figure 36:
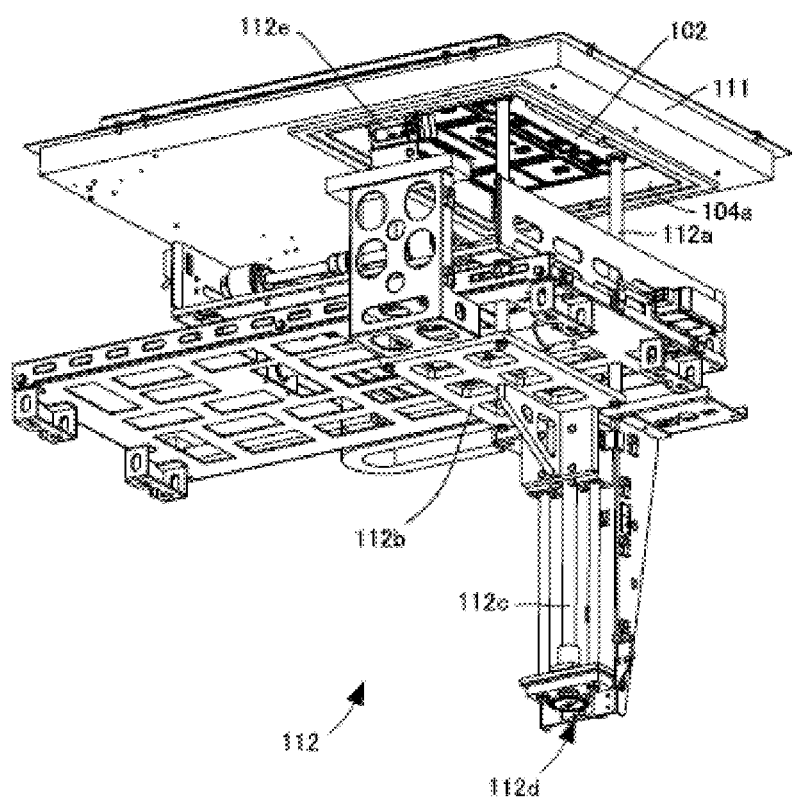
FIG. 36 is an enlarged perspective view, illustrating part of the container transfer section in FIG. 10.

The medical agent tray 102 may be so designed that it will move down if it receives a load exceeding a predetermined amount while it is exposed to (accessible from) the inside of the coinfusion processing room 104. This arrangement will help, for example, if the first robot arm 21 has failed to grasp the medical agent container 10 on the medical agent tray 102 and as a result the medical agent tray 102 has been pressed down. Even in such a case, the medical agent tray 102 moves down and thereby prevents such consequences as breakage of the medical agent container 10 or the medical agent tray 102. In the above-described embodiment, as shown also in FIG. 36, a tray elevating section 112 raises/lowers the medical agent tray 102. The tray elevating section 112 include, for example, four shafts 112a which are movable in up-down direction to lift the medical agent tray 102 from a lower position to a higher position. The shafts 112a are supported by a support plate 112b, and a nut section which is threaded to a threaded shaft 112c fixed to this support plate 112b. With this, upon receiving a load from above, the nut section and the support plate 112b moves down along the threaded shaft 112c. The threaded shaft 112c is rotated by a motor. If the motor is designed to be de-energized when the medical agent tray 102 has reached the level of the tray-path opening 104a, then the above-described "load exceeding a predetermined amount" is determined only by mechanical conditions regarding the nut section and the threaded shaft 112c. On the other hand, if the motor is designed to have a continuous power supply, then it is possible to use the power supply wattage to control the "load exceeding a predetermined amount".

The medical agent tray 102 may be designed to automatically come up to the position to expose itself to the inside of the coinfusion processing room 104 upon removal of the said load. If the motor is not provided by a pulse motor, a rotary encoder 112d may be provided to determine the amount of downward movement of the medical agent tray 102. The motor will be driven just to compensate for the amount of downward movement so as to bring the medical agent tray 102 back to the position to expose itself to the inside of the coinfusion processing room 104. If the medical agent tray 102 has moved down, and if the robot arm will make a re-try to grasp, then the motor is driven to bring the medical agent tray 102 back to the predetermined position before the re-try is attempted.

Means for raising/lowering the medical agent tray 102 is not limited to a mechanism using the threaded shaft 112c, but can also include a belt mechanism for example. The downward movement of the medical agent tray 102 upon reception of the load exceeding a predetermined amount need not necessarily be made by the raising/lowering device, but may be made by a shock absorbing device (spring, absorber, etc.). Also, if the arrangement includes the support fingers for supporting the medical agent tray 102 on the edge, then the support fingers may be raised/lowered by a raising/lowering device, or the support fingers may have a shock absorbing device.

An inclination detection sensor may be provided to detect an inclination of the medical agent tray 102 exposed to the inside of the coinfusion processing room 104. For example, in a structure which employs the shaft 112a, there is a possibility that the medical agent tray 102 will become inclined with respect to the shaft 112a when the first robot arm 21 pushes the medical agent tray 102 downward on an outside position of the shaft 112a. The inclination detection sensor enables to detect an inclination of the medical agent tray 102, upon which the controller 500 can determine that there is an error and perform a predetermined process. The inclination detection sensor can be implemented, for example, by an image sensor 112e which takes images of the medical agent tray 102 obliquely from the bottom side, for comparison between an image of the tray in a normal state and an image of the tray in an inclined state to determine if there is any inclination. Obviously, the arrangement is not limited by such an optical sensor. If the support fingers are used to support the edges of the medical agent tray 102, it is also a good idea to include the inclination detection sensor.

Figure 37:
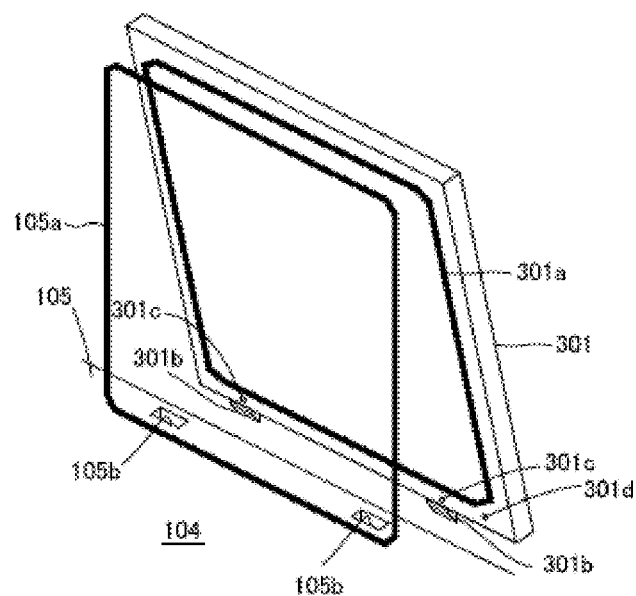
FIG. 37 is an explanatory view illustrating an open/close state detection mechanism of the main door of the coinfusion apparatus in FIG. 1.

In yet another alternative embodiment, as shown in FIG. 37, the coinfusion processing room 104 includes: a main door 301 which opens/closes the space constraints within coinfusion processing room 104; a door packing 301a provided around the back surface of the main door 301; a cabinet body packing 105a provided in a cabinet body 105 of the coinfusion processing room 104 for making contact with the door packing 301a when the main door 301 is closed; movable latches 301b provided in the main door 301; recessed sections 105b formed in the cabinet body 105 for catching the movable latches 301b; a first sensor 301c for detecting a state of the movable latches 301b; a second sensor 301d for detecting that the main door 301 is in proximity of the cabinet body 105; and a determination section (the controller 500) which determines that the main door 301 is closed if the first sensor 301c detects that the movable latches 301b are extended and the second sensor 301d detects that the door is in proximity of the cabinet body 105. In this design, the movable latches 301b caught in the recessed sections 105b will ensure that the main door 301 is reliably closed.

According to this embodiment, it is possible to reliably open/close the main door 301 with a relatively simple structure composed of the packings 301a, 105a; the movable latches 301b; and the first and the second sensors 301c, 301d. Alternatively, the movable latches 301b may be provided in the cabinet body 105, with the recessed sections 105b provided in the main door 301. The first and the second sensors 301c, 301d can be provided by contact switches or proximity switches.

Figure 38:
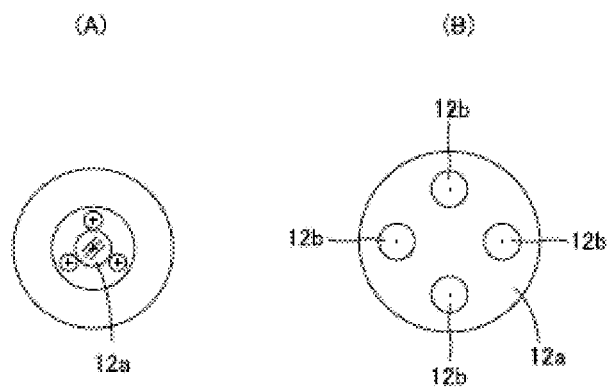
FIG. 38 is an explanatory view illustrating an example of coinfusion mouth of a transfusion bag.

FIG. 38(A) shows an example of the coinfusion mouth of the transfusion bag 12 (rubber plug): An outermost circle indicates an outer edge of the coinfusion mouth; an innermost circle (hatched region) indicates a needle insertion execution area 12a selected by the coinfusion apparatus; an intermediate circle indicates an area of the coinfusion mouth where needle insertion is possible; and three circles between the innermost circle and the intermediate circle indicate port regions which have a thinner wall so that a human operator such as a nurse can make an easy insertion of a bottle needle or a syringe needle. FIG. 38(B) is an enlarged view of the needle insertion execution area 12a shown in FIG. 38(A), illustrating four circular regions 12b selected within the needle insertion execution area 12a as places where needle insertion is supposed to be made. It should be noted here that the bottle needle is a needle at an end of an intravenous infusion tube, with the other end of the tube being provided with a needle for insertion into a human patient.

In the above-described type of coinfusion mouth, i.e., when the port regions for the bottle needle are not in the center region of the coinfusion mouth, the needle insertion execution area 12a is selected as a circular region which has its center at the center of the coinfusion mouth and a radius r1 as the shortest distance from the center to the port regions. In other words, insertion of the syringe needle 11c will not be made in a doughnut region which is a region obtained by removing the circular region that has the radius r1 from a circular region that has its center at the center of the coinfusion mouth and a radius r2 as the longest distance from the center of the coinfusion mouth to the port regions. Specifically, the doughnut region is a needle insertion prohibition area for the coinfusion apparatus. An inside area of the intermediate circle can be used by a human operator for needle insertion. However, for the coinfusion apparatus, the area is a mix of the needle insertion prohibition area and the needle insertion execution area 12a. A region in the coinfusion mouth outside of the circle of radius defined by the distance r2 may also be used as the needle insertion execution area 12a.

A human operator will have no difficulties in making a needle insertion with a syringe 11 to a place other than an OUT port which is dedicated to bottle needles. However, the present coinfusion apparatus cannot identify where the OUT ports are, so cannot make a needle insertion into the doughnut region by reliably avoiding the OUT port regions. Specifically, although the ports are formed at a predetermined radial location in the coinfusion mouth, the circumferential locations in the coinfusion mouth differs from one transfusion bag 12 to another. This is because the manufacturer can choose any place in the circumferential direction in the coinfusion mouth for the ports when attaching the rubber plug to the transfusion bag 12. Consequently, it is not known where the ports are on the 360-degree circular belt in the coinfusion mouth. Therefore, the circular region having the radius r1 from the center of the coinfusion mouth is selected as the needle insertion execution area 12a for the needle insertion. This makes it possible to avoid needle insertion into any of the ports.

As explained further above, in order to ensure an appropriate needle insertion, the present coinfusion apparatus may be configured to perform: a process of identifying a needle insertion execution area 12a for a syringe needle 11c in the coinfusion mouth of the transfusion bag 12, as a circular region around the center of the coinfusion mouth; and a process of inserting the syringe needle 11c through the needle insertion execution area 12a. In cases where OUT ports are located at a center region of the coinfusion mouth, that center region which includes the OUT ports is removed and the remaining region is selected as a needle insertion possible area, and it is appropriate to perform needle insertion in this region.

It should be noted here that a camera may be used to take an image of the coinfusion mouth of the transfusion bag 12 when the mouth is located at the coinfusion communication mouth 37. In this case, the area including OUT ports are determined from the captured image and the OUT ports are avoided when making needle insertion. For example, the OUT port may be defined as a shape perceived as a double circle; an image recognition is performed to find double circles; and regions inside the double circles are determined as OUT ports to be avoided in the needle insertion.

Type information about the coinfusion mouth of the transfusion bag 12 (patterns of needle insertion execution areas 12a) can be stored in the master table. Also, information about the number of the circular regions 12b and sequence of use thereof in the needle insertion execution area 12a for the scheduled needle insertion step can be stored in the master table. Examples of other information which can also be stored in the master table include the volume of liquid in the transfusion bag 12, the name of manufacturer, content identification (normal saline solution, glucose, etc.), thickness of the coinfusion mouth rubber plug, and so on. Various information, such as the above, may also be stored for those transfusion bags which have the bottle needle port regions not eccentric from the center of the coinfusion mouth. For example, as shown in FIG. 42 and FIG. 43, if there are five types, (1) through (5), in the coinfusion mouth, then information of these five different types of the needle insertion execution area is stored in the master table.

Then, based on the detailed prescription information, it is possible to know the location of the needle insertion execution area in the transfusion bag to be used in the coinfusion processing. In FIG. 42 and FIG. 43, hatched regions indicate needle insertion execution areas. Each of these needle insertion execution areas is enlarged in an illustration in a rectangular frame. The enlarged view of the needle insertion execution area includes numbered circles, each representing a place for a needle insertion in the coinfusion apparatus. In cases where a plurality of needle insertions are to be made, the needle insertion will be made using these circles in the order of increasing numbers. It should be noted that each of the types (1), (4) and (5), has as many as 20 needle insertion locations 201 but not all of them are numbered: Only location numbers from 1 to 10 are used but 11 and greater numbers are not shown. The needle insertion locations are spaced equally in the circle's circumferential direction.

Figure 39:
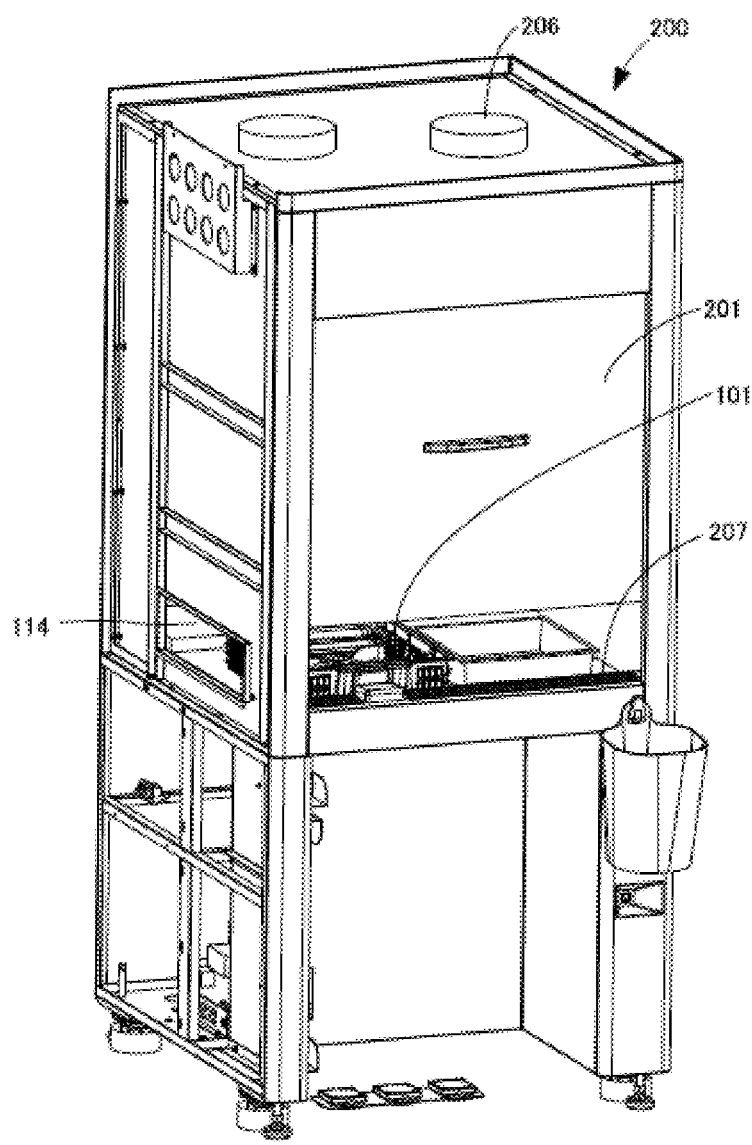
FIG. 39 is a perspective view illustrating another example of a supply section of the coinfusion apparatus in FIG. 1.

If the door 201 which opens/closes the opening in the supply section (clean bench) 200 is slightly open as shown in FIG. 39 when the unillustrated shutter for the communication mouth 114 is opened, there can be a fairly strong stream of air from the container conveying section 110 through the door 201, to hit a belly of the human operator since the container conveying section 110 is positively pressurized.

The air is supplied from the air purifier 206 to the working space and this keeps the pressure of the working space slightly higher than atmospheric. When the shutter in the communication mouth 114 is opened, the air purifier 206 reduces the amount of air supply therefrom. For example, the amount may be 100% before the reduction, but the amount after the reduction is not lower than 90% but not higher than 99%.

In yet another alternative embodiment, a mesh member 207 and a duct may be provided at a lower portion of the opening in the supply section 200, and suction via this duct is started or the amount of air suction via this duct is increased when the shutter in the communication mouth 114 is opened so that the air from the door 201 will not be so strong.

Figure 40:
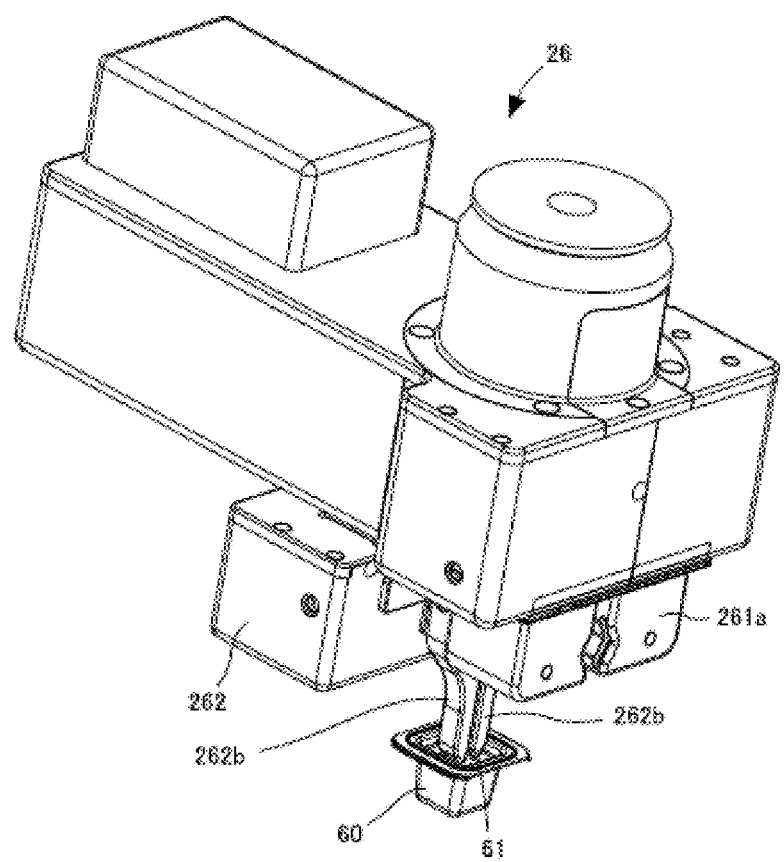
FIG. 40 is a perspective view illustrating the syringe handling section shown in FIG. 12 grasping a piece of absorbent cotton.

FIG. 40 illustrates that the second grip nails 262b in the syringe handling section 26 is picking a piece of absorbent cotton 61 in a container 60. The container 60 in which the absorbent cotton 61 is set in the preparation container 101 for example, is placed on a stand-by table in the coinfusion processing room 104 by the first robot arm 21. Then, after the liquid medical agent injection into the transfusion bag 12 has been completed, the syringe handling section 26 of the second robot arm 22 picks up the absorbent cotton 61 from inside the container 60, using the second grip nails 262b as shown in FIG. 40 while the first robot arm 21 still holds the container 60, for example. Further, the second robot arm 22 performs an operation of cleaning the coinfusion mouth of the transfusion bag 12 with the absorbent cotton 61. After this cleaning operation, the sealing trash lid 132a is opened, and the second robot arm 22 drops the used absorbent cotton 61 into the trash box 131. The arrangement makes it possible to remove the liquid medical agent left on the coinfusion mouth inside the coinfusion processing room 104.

In cases where the medical agent must be kept in a light-shielded environment, the transfusion bag 12 is manually placed into a light-blocking bag by a human operator after the coinfusion processing. The present coinfusion processing allows the transfusion bag 12 to be placed in the preparation container 101 while the transfusion bag 12 is in a light-blocking bag.

Additionally, when the medical agent requires a light-shielding environment for storage, lighting inside the coinfusion processing room 104 may be turned off during the time while the coinfusion processing is performed. However, the lighting may be provided temporarily in the coinfusion processing room 104 when necessary for taking images for inspecting purpose. To determine if a medical agent requires light shielding, the master table has a light blockage enable/disable flag for each medical agent. When the light blockage enable/disable flag is ON, the light is turned OFF.

Figure 41:
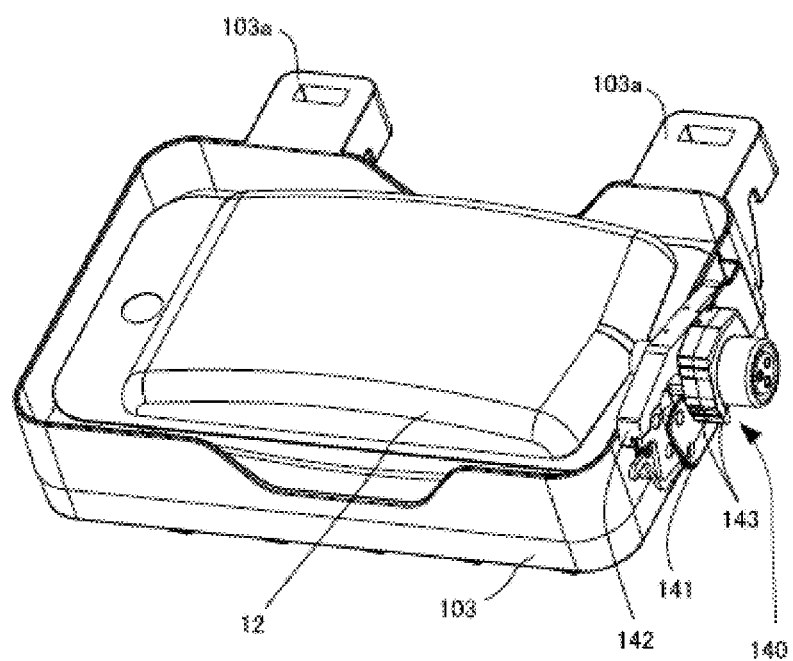
FIG. 41 is a perspective view illustrating a state where spacers are attached to the chuck section of the transfusion bag retention section shown in FIG. 6.

FIG. 41 shows how spacers 143 are used at the chuck section 140 if the coinfusion mouth of a transfusion bag 12 has a long neck. If the coinfusion mouth has a long neck and therefore there is a gap between the head section of the coinfusion mouth and the chuck section 140, the transfusion bag 12 is likely to be moved when the needle is inserted. The gap can be filled with one or more spacers 143 attached to the upper member 142 to prevent the transfusion bag 12 from moving. For example, the upper member 142 and the spacers 143 are formed with a protruding section and a recessed section for mutual fitting with each other. The attaching is completed by mating the columnar protruding section and a circular recessed section with each other.

In one embodiment, items such as, for example, syringes 11, syringe needles 11c, medical agents, etc. are brought from the medical agent tray 102 into the coinfusion processing room 104, by taking into account the order of their use. This may reduce waiting time of the two robot arms 21, 22, and also reduce the time for a coinfusion processing. As an example, the controller 500 refers to the detailed prescription information to identify which syringe 11 and syringe needle 11c are to be used first, and identifies the syringe 11 and the syringe needle 11c in the medical agent tray 102 based on a result of image recognition. The controller 500 makes the first robot arm 21 pick the syringe needle 11c, and makes the syringe needle attaching/detaching device 43 set the syringe needle 11c. Next, the first robot arm 21 is made to grasp the syringe 11 and then to pass this syringe 11 to the syringe handling section 26 of the second robot arm 22. Concomitantly, while the second robot arm 22 is attaching the syringe needle 11c to the syringe 11, the controller 500 also makes the first robot arm 21 pick other items from the medical agent tray 102 and place them onto the stand-by table for temporary storage.

Now, once the medical agent container 10 has been agitated by the agitator 32 shown in FIG. 30, the circular regions 12b shown in FIG. 38(B) are likely to be at different circumferential locations from the locations before the agitation was made on the medical agent container 10. Thus, there can be a case where the syringe needle 11c is inserted into a place other than the predetermined circular regions 12b. In order to prevent this, during a time after the first robot arm 21 picks the medical agent container 10 from the medical agent tray 102 to the time when the syringe needle 11c is inserted into the medical agent container 10, the first robot arm 21 places the medical agent container 10 on the two rollers 34a shown in FIG. 21, so that the medical agent container 10 is rotated by a predetermined angle from the angle at which the bar code was read on the medical agent container 10; and thereafter, the first robot arm 21 picks the medical agent container 10. Further, similarly to the above, during a time after the medical agent container 10 is agitated by the agitator 32 shown in FIG. 30 to the time when the syringe needle 11c is inserted into the medical agent container 10, the first robot arm 21 places the medical agent container 10 onto the two rollers 34a shown in FIG. 21, so that the medical agent container 10 is rotated by a predetermined angle from the angle at which the bar code was read on the medical agent container 10; and thereafter the first robot arm 21 picks the medical agent container 10. By giving a rotation as described above, by a predetermined angle from the angle when the bar code was read, each circular region 12b comes back to the previous position in the circumferential direction of the medical agent container 10 when the syringe needle 11c is inserted, and therefore it becomes possible to prevent a case that the syringe needle 11c is inserted at a location other than the predetermined circular regions 12b.

While the principles of the disclosure have been described above in connection with specific apparatuses, it is to be clearly understood that this description is made only by way of example and not as limitation on the scope of the invention.

The invention claimed is:

1. A coinfusion apparatus comprising:
a first robot arm which retains a medical agent container;
a second robot arm which retains a syringe and performs sucking and injection of a liquid medical agent with the syringe;
a coinfusion processing room in which at least the two robot arms perform a coinfusion processing; and
a controlling section which operates said at least two robot arms for performing a process of sucking a liquid medical agent from inside the medical agent container or a liquid medical agent prepared inside the medical agent container, with the syringe and injecting the liquid medical agent into a transfusion bag with the syringe, wherein
the second robot arm includes a retention section provided by a pair of nail sections which can be brought away from and closer to each other for retaining the syringe, said pair of nail sections having mutually opposed surfaces, each formed with an inclined section of a downward inclination from an upper end surface of the nail section to the opposed surface.

2. The coinfusion apparatus according to claim 1, wherein the second robot arm includes a plunger operating section provided by a pair of nail sections which can be brought away from and closer to each other for retaining a plunger of the syringe and moving the plunger in a stroke motion, the plunger operating section or a retention section for retaining the syringe also having grip nails for retaining an item.

3. The coinfusion apparatus according to claim 1, further comprising a bent needle detection section for detecting a bend in a syringe needle attached to the syringe.

4. The coinfusion apparatus according to claim 3, wherein the bent needle detection section detects the bend in the syringe needle by using positional information from optical sensors each including a beam transmitter section and a beam receiver section for allowing a beam to be blocked by the syringe needle of the syringe retained and moved by the second robot arm.

5. The coinfusion apparatus according to claim 1, wherein after the syringe is brought into the coinfusion processing room, the plunger of the syringe is pushed into a syringe main body in the coinfusion processing room before starting a sucking action to suck a transfusion or a liquid medical agent with the syringe.

6. The coinfusion apparatus according to claim 5, wherein the plunger pushing operation into the syringe main body is performed by using the plunger operating section designed to move the plunger, while the second robot arm retains the syringe main body of the syringe.

* * * * *